US010877617B2

(12) United States Patent
Park et al.

(10) Patent No.: US 10,877,617 B2
(45) Date of Patent: Dec. 29, 2020

(54) TOUCH PANEL PROVIDING DRIVING SIGNALS WITH REDUCED OFFSETS

(71) Applicants: SAMSUNG DISPLAY CO., LTD., Yongin-si (KR); ULSAN NATIONAL INSTITUTE OF SCIENCE AND TECHNOLOGY, Ulsan (KR)

(72) Inventors: Won Sang Park, Yongin-si (KR); Seong Mun Kim, Ulsan (KR); Yun Ho Kim, Hwaseong-si (KR); Il Nam Kim, Hwaseong-si (KR); Kyeong Min Park, Ulsan (KR); Franklin Bien, Ulsan (KR); Joo Hyeb Song, Ulsan (KR); Keum Dong Jung, Seoul (KR); Eun Ho Choi, Ulsan (KR); Sang Hyun Heo, Ulsan (KR)

(73) Assignees: SAMSUNG DISPLAY CO., LTD., Yongin-si (KR); ULSAN NATIONAL INSTITUTE OF SCIENCE AND TECHNOLOGY, Ulsan (KR)

(*) Notice: Subject to any disclaimer, the term of this patent is extended or adjusted under 35 U.S.C. 154(b) by 0 days.

(21) Appl. No.: 16/386,728

(22) Filed: Apr. 17, 2019

(65) Prior Publication Data

US 2019/0339803 A1     Nov. 7, 2019

(30) Foreign Application Priority Data

May 2, 2018    (KR) ........................ 10-2018-0050687

(51) Int. Cl.
     *G06F 3/047*      (2006.01)
     *G06F 3/044*      (2006.01)

(52) U.S. Cl.
     CPC .............. *G06F 3/047* (2013.01); *G06F 3/044* (2013.01)

(58) Field of Classification Search
     CPC .... G06F 3/0416; G06F 3/04182; G06F 3/044; G06F 3/0443; G06F 3/0445; G06F 3/0446; G06F 3/047
     See application file for complete search history.

(56) References Cited

U.S. PATENT DOCUMENTS 8,605,054 B2    12/2013   Krenik et al.
8,711,129 B2     4/2014   Hotelling et al.
(Continued)

FOREIGN PATENT DOCUMENTS

KR       10-1522532      5/2015
KR       1020170086752    7/2017
KR       10-1808348      12/2017

OTHER PUBLICATIONS

Heo, Sanghyun et al., "72 dB SNR, 240 Hz Frame Rate Readout IC With Differential Continuous-Mode Parallel Architecture for Larger Touch-Screen Panel Applications", IEEE Transactions on Circuits and Systems I: Regular Papers, vol. 63, No. 7. Jul. 2016, pp. 960-971.

(Continued)

*Primary Examiner* — Chun-Nan Lin
(74) *Attorney, Agent, or Firm* — F. Chau & Associates, LLC

(57) ABSTRACT

A touch panel includes a touch sensing circuit including a plurality of driving electrode lines and a plurality of sensing electrode lines, which intersect the driving electrode lines. The touch panel further includes a driving signal generation circuit that generates a plurality of driving signals and transmits the driving signals to the driving electrode lines, and a sensing circuit that receives a plurality of sensing signals from the sensing electrode lines. The driving signals have voltages that are not equal to zero during a first time zone, and the sum of driving signals generated at the same (Continued)

time is maintained to be equal to zero during the first time zone.

13 Claims, 15 Drawing Sheets

(56) References Cited

U.S. PATENT DOCUMENTS

| | | | | |
|---|---|---|---|---|
| 2008/0158175 | A1* | 7/2008 | Hotelling | G06F 3/0418 |
| | | | | 345/173 |
| 2014/0132541 | A1* | 5/2014 | Miyamoto | G06F 3/041 |
| | | | | 345/173 |
| 2016/0306456 | A1* | 10/2016 | Slamkul | G06F 3/0418 |

OTHER PUBLICATIONS

Park, Jun-Eun et al., "A 100-TRX-Channel Configurable 85-to-385Hz-Frame-Rate Analog Front-End for Touch Controller with Highly Enhanced Noise Immunity of 20Vpp", 2016 IEEE International Solid-State Circuits Conference (ISSCC) 2016.

* cited by examiner

TOUCH PANEL PROVIDING DRIVING SIGNALS WITH REDUCED OFFSETS

CROSS-REFERENCE TO RELATED APPLICATIONS

This application claims priority under 35 U.S.C. § 119 to Korean Patent Application No. 10-2018-0050687, filed on May 2, 2018, the disclosure of which is incorporated by reference herein in its entirety.

TECHNICAL FIELD

Exemplary embodiments of the present disclosure relate to a touch panel.

DISCUSSION OF THE RELATED ART

In a typical method used to measure the capacitance of each sensing node of a touch panel, a driving signal generation unit applies driving signals with a predetermined frequency via driving lines, and a sensing unit measures signals received via sensing lines.

The driving signals may be modified using Walsh-Hadamard codes. However, driving signals using Walsh-Hadamard codes may have large offsets.

SUMMARY

Exemplary embodiments of the present disclosure provide a touch panel capable of providing driving signals with reduced offsets.

According to an exemplary embodiment of the present disclosure, a touch panel includes a touch sensing circuit including a plurality of driving electrode lines and a plurality of sensing electrode lines. The sensing electrode lines are insulated from the driving electrode lines. The touch panel further includes a driving signal generation circuit that generates a plurality of driving signals and transmits the driving signals to the driving electrode lines, and a sensing circuit that receives a plurality of sensing signals from the sensing electrode lines. The driving signals have voltages that are not equal to zero during a first time zone, and the sum of driving signals generated at the same time is maintained to be equal to zero during the first time zone.

According to an exemplary embodiment of the present disclosure, a touch panel includes a touch sensing circuit including a plurality of driving electrode lines and a plurality of sensing electrode lines. The sensing electrode lines are insulated from the driving electrode lines. The touch panel further includes a driving signal generation circuit that generates a plurality of driving signals and transmits the driving signals to the driving electrode lines, and a sensing circuit that receives a plurality of sensing signals from the sensing electrode lines. The driving signals are periodic voltages that are repeated at intervals of a first time zone, the first time zone is divided into a plurality of second time zones, which are shorter than the first time zone, the driving signals have voltages that are not equal to zero during all time zones, and the sum of the driving signals is maintained to be equal to zero during each time zone.

According to an exemplary embodiment of the present disclosure, a method of driving a touch panel includes transmitting a first signal from a voltage source to a code generator circuit, dividing the first signal transmitted to the code generator circuit into a plurality of driving signals, and transmitting the driving signals to a plurality of driving electrode lines. The driving signals have voltages that are not equal to zero during a first time zone, and the sum of driving signals generated in the same time zone is maintained to be equal to zero during the first time zone.

According to exemplary embodiments of the present disclosure, driving signals with reduced offsets can be provided, and as a result, a touch panel can be miniaturized.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION

Figure 1:
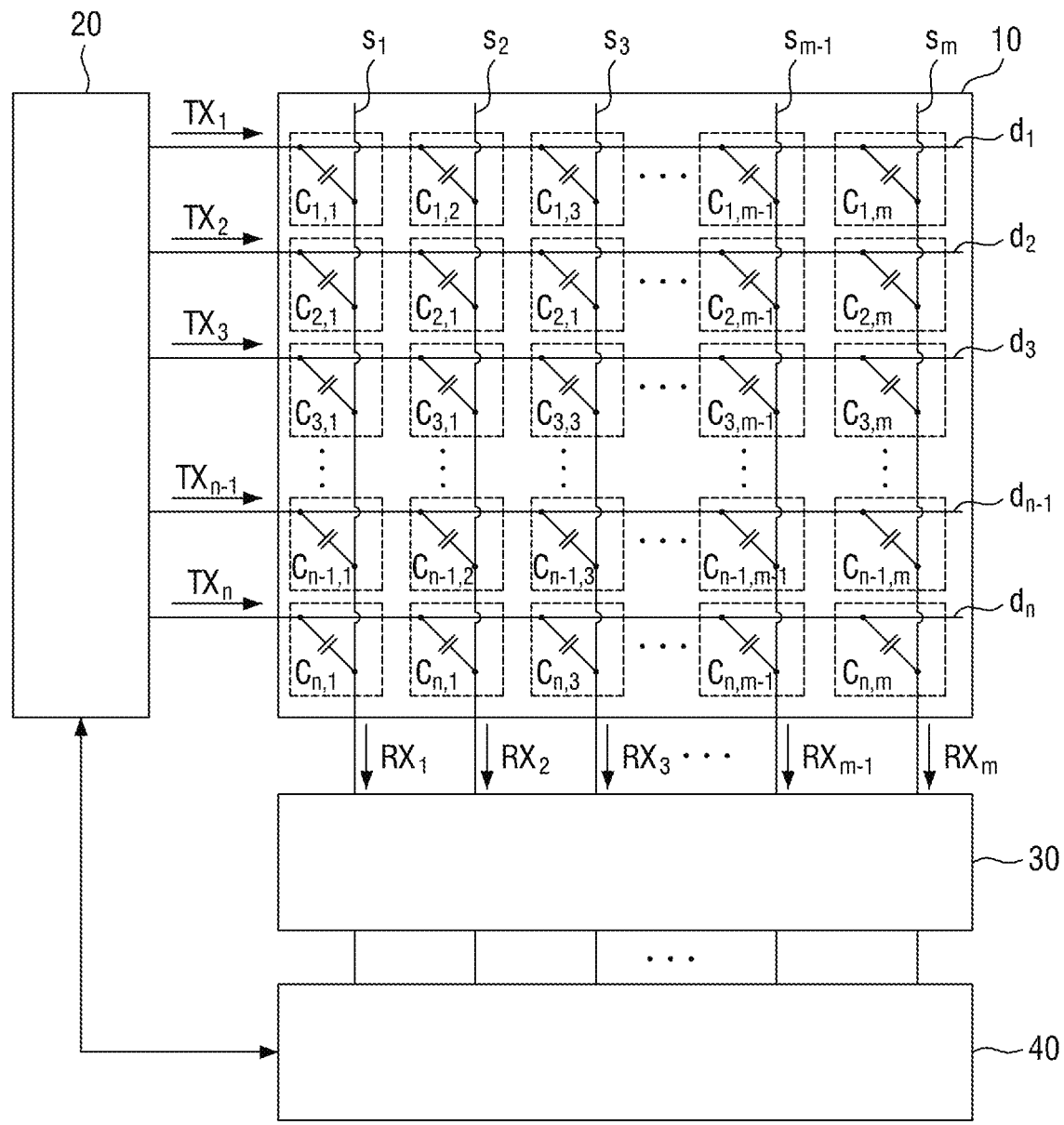
FIG. 1 is a block diagram of a touch panel according to an exemplary embodiment of the present disclosure.

Exemplary embodiments of the present disclosure will be described more fully hereinafter with reference to the accompanying drawings. Like reference numerals may refer to like elements throughout the accompanying drawings.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the disclosure.

FIG. 1 is a block diagram of a touch panel according to an exemplary embodiment of the present disclosure.

Referring to FIG. 1, the touch panel according to an exemplary embodiment includes a touch sensing unit 10

(also referred to herein as a touch sensing circuit), a driving signal generation unit 20 (also referred to herein as a driving signal generation circuit), a sensing unit 30 (also referred to herein as a sensing circuit), and a control unit 40 (also referred to herein as a control circuit).

The touch sensing unit 10 includes a plurality of first through n-th driving electrodes $d_1$ through $d_n$ and a plurality of first through m-th sensing electrodes $s_1$ through $s_m$, wherein n and m are integers greater than or equal to 2. As illustrated in FIG. 1, the first through n-th driving electrodes $d_1$ through $d_n$ may be arranged in parallel along a horizontal direction (or along a row direction), and the first through m-th sensing electrodes $s_1$ through $s_m$ may be arranged in parallel along a vertical direction (or along a column direction). For example, the touch sensing unit 10 may have an array structure in which the first through n-th driving electrodes $d_1$ through $d_n$ and the first through m-th sensing electrodes $s_1$ through $s_m$ intersect each other while being insulated from each other.

FIG. 1 illustrates the first through n-th driving electrodes $d_1$ through $d_n$ and the first through m-th sensing electrodes $s_1$ through $s_m$ as crossing each other at a right angle. However, exemplary embodiments of the inventive concept are not limited thereto. For example, in exemplary embodiments, the first through n-th driving electrodes $d_1$ through $d_n$ and the first through m-th sensing electrodes $s_1$ through $s_m$ may cross each other at an inclination or may not cross each other at all.

Sensing nodes may be defined by sensing capacitors $C_{1,1}$ through $C_{n,m}$, which are disposed between the first through n-th driving electrodes $d_1$ through $d_n$, and the first through m-th sensing electrodes $s_1$ through $s_m$. The touch sensing unit 10 may include a plurality of sensing nodes arranged in the row direction and in the column direction.

As illustrated in FIG. 1, each of the first through n-th driving electrodes $d_1$ through $d_n$, corresponds to a driving line extending from the driving signal generation unit 20 in the horizontal direction, in which each driving line is connected to a plurality of sensing nodes from among the sensing nodes defined by the sensing capacitors $C_{1,1}$ through $C_{n,m}$, and through which a driving signal from among first through n-th driving signals $TX_1$ through $TX_n$ is provided. Thus, the first through n-th driving electrodes $d_1$ through $d_n$ may also be referred to herein as first through n-th driving electrode lines $d_1$ through $d_n$. Similarly, as illustrated in FIG. 1, each of the first through m-th sensing electrodes $s_1$ through $s_m$ corresponds to a sensing line extending from the sensing unit 30 in the vertical direction, in which each sensing line is connected to a plurality of sensing nodes from among the sensing nodes defined by the sensing capacitors $C_{1,1}$ through $C_{n,m}$ and through which a sensing signal from among first through m-th sensing signals $RX_1$ through $RX_m$, is received. Thus, the first through m-th sensing electrodes $s_1$ through $s_m$ may also be referred to herein as first through m-th sensing electrode lines $s_1$ through $s_m$.

The touch sensing unit 10 may be incorporated with a layer for displaying an image in accordance with an appropriate panel design method, or may share driving or sensing paths.

The driving signal generation unit 20 is electrically connected to the first through n-th driving electrodes $d_1$ through $d_m$, and provides the first through n-th driving signals $TX_1$ through $TX_n$ to the first through n-th driving electrodes $d_1$ through $d_m$, respectively. For example, the driving signal generation unit 20 may provide at least two of the first through n-th driving signals $TX_1$ through $TX_n$ at the same time. The expression "events occur at the same time", as used herein, means that the events occur precisely simultaneously, or almost simultaneously. For example, the expression "events occurring at the same time", as used herein, means that the events begin and end almost at the same time, and/or means that there exists an overlapping period between the occurrence of one event and the occurrence of the other event.

The first through n-th driving signals $TX_1$ through $TX_n$ may be voltages that swing between a high level and a low level. The first through n-th driving signals $TX_1$ through $TX_n$ may be periodic voltages that are repeated periodically at intervals of a frame. The first through n-th driving signals $TX_1$ through $TX_n$ may be applied to the first through n-th driving electrodes $d_1$ through $d_n$ at the same time.

The sensing unit 30 is electrically connected to the first through m-th sensing electrodes $s_1$ through $s_m$ and detects the sensing capacitances of the sensing capacitors $C_{1,1}$ through $C_{n,m}$ between the first through n-th driving electrodes $d_1$ through $d_n$, to which the first through n-th driving signals $TX_1$ through $TX_n$ are applied, and the first through m-th sensing electrodes $s_1$ through $s_m$, which correspond to the first through n-th driving electrodes $d_1$ through $d_n$. In response to a touch event occurring, the sensing unit 30 may detect a touch location based on capacitance variations detected from sensing capacitors near the touch location, as described in detail below.

The driving signal generation unit 20 includes at least one driving circuit that provides the first through n-th driving signals $TX_1$ through $TX_n$ to the first through n-th driving electrodes $d_1$ through $d_n$. The sensing unit 30 includes at least one sensing circuit that senses the first through m-th sensing signals $RX_1$ through $RX_m$ received from the first through m-th sensing electrodes $s_1$ through $s_m$. The driving circuit and the sensing circuit will be described in detail below.

The control unit 40 controls the operations of the driving signal generation unit 20 and the sensing unit 30. For example, the control unit 40 may control the driving signal generation unit 20 and the sensing unit 30 in accordance with a driving control signal and a sensing control signal.

Figure 4:
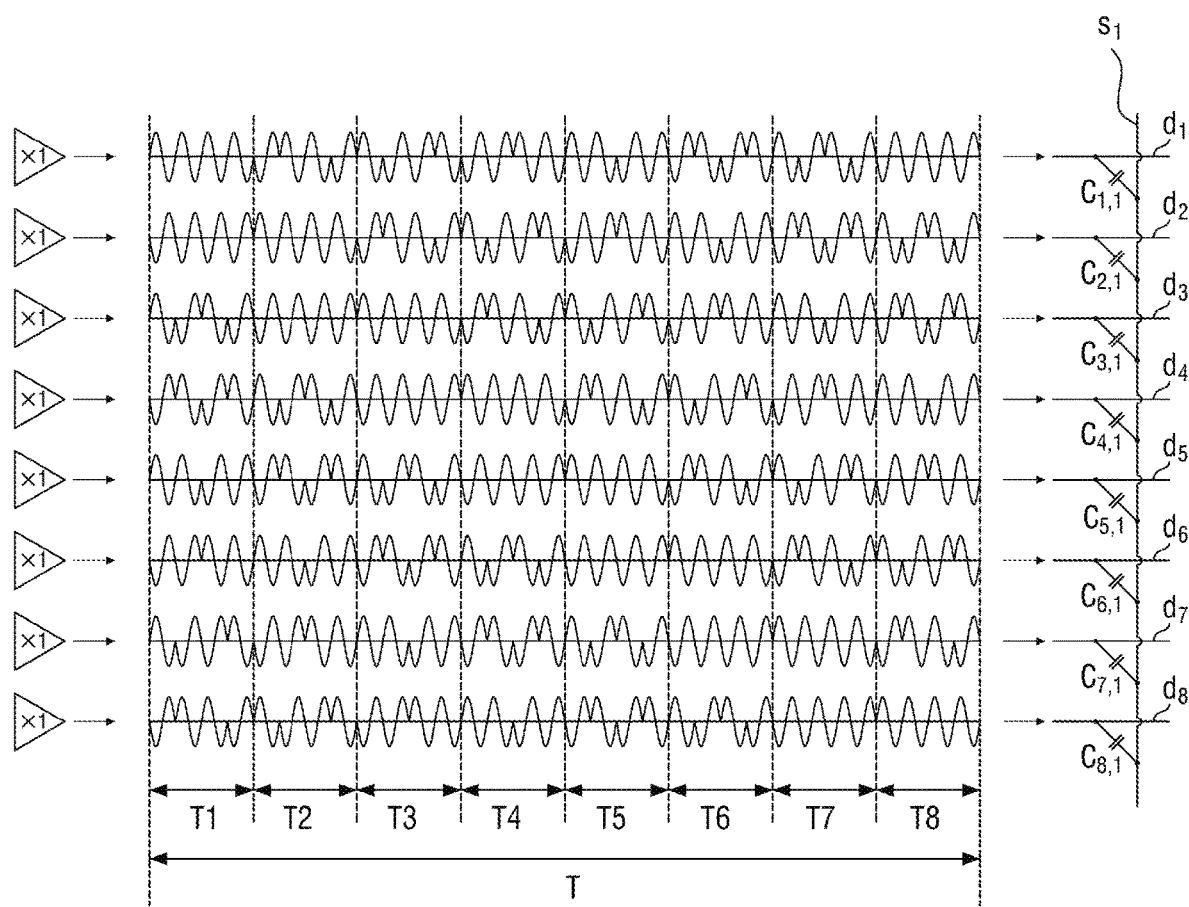
FIG. 4 is a timing diagram showing the waveforms of driving signals generated by the code generator of FIG. 2.

The control unit 40 may control the driving signal generation unit 20 to drive a plurality of driving lines at the same time in accordance with a clock signal. For example, the control unit 40 may control a plurality of driving circuits to drive the plurality of driving lines at the same time, as shown in FIG. 4.

The control unit 40 may detect signals received via sensing lines and may control the sensing unit 30 to output sensing signals based on the detected signals.

Figure 2:
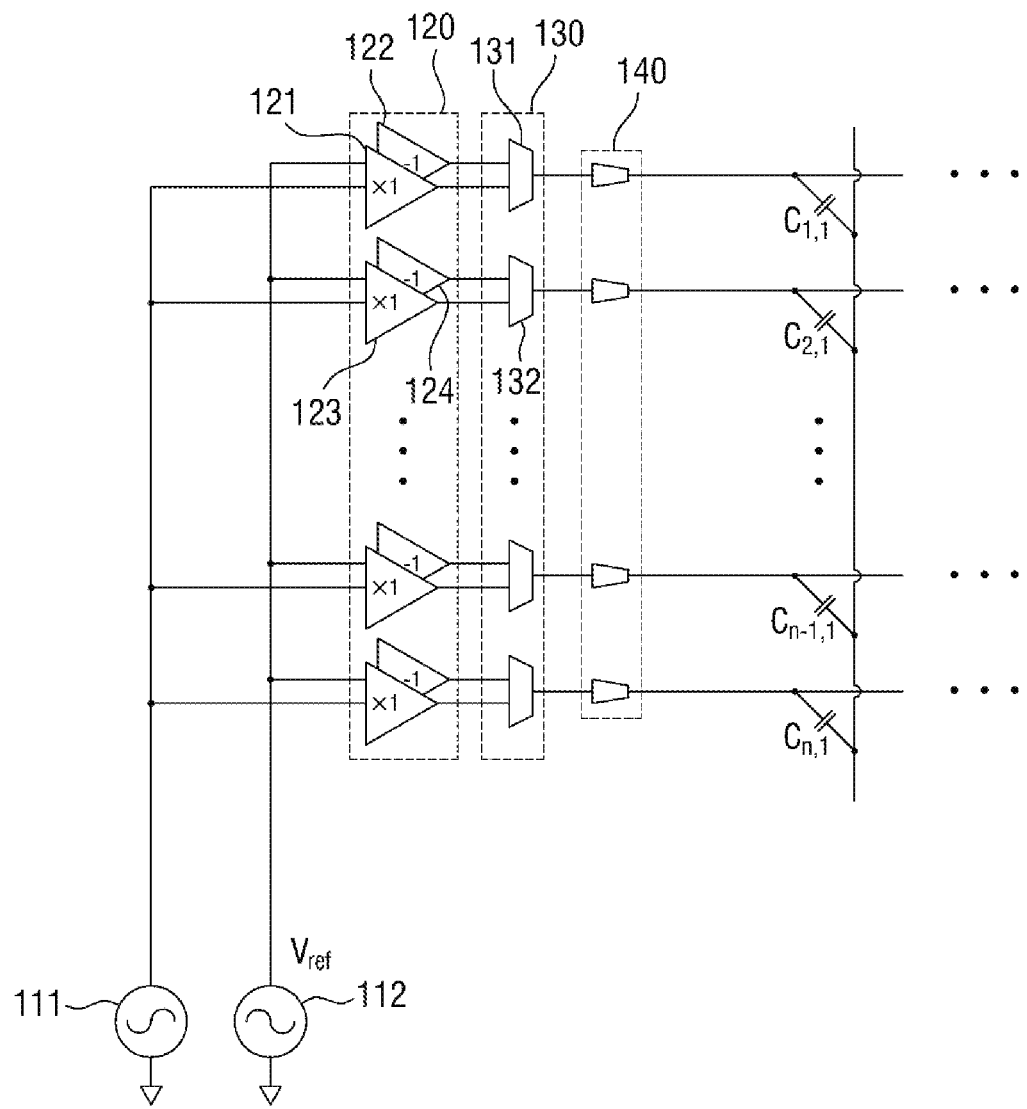
FIG. 2 is a circuit diagram of a driving signal generation unit of the touch panel of FIG. 1.

FIG. 2 is a circuit diagram of the driving signal generation unit of FIG. 1.

Referring to FIG. 2, in an exemplary embodiment, the driving signal generation unit 20 includes voltage sources (111 and 112), a code generator 120 (also referred to as a code generator circuit), a driving analog multiplexer 130, and a cell delay element 140, which are connected between the voltage sources (111 and 112) and the first through n-th driving electrodes $d_1$ through $d_n$. In an exemplary embodiment, the cell delay element 140 is not included.

The voltage sources (111 and 112) include a first voltage source 111 and a second voltage source 112. One of the first and second voltage sources 111 and 112 may be a reference voltage source. The first and second voltage sources 111 and 112 may generate signals in the form of square sine waves or triangular waves, and may provide the generated signals to the driving lines.

FIG. 2 illustrates the first and second voltage sources 111 and 112 as being alternating current (AC) voltage sources. However, exemplary embodiments of the present disclosure are not limited thereto. For example, in an exemplary embodiment, a first AC voltage source having a positive level, a second AC voltage source having a negative level, and/or a third AC voltage source, which becomes a reference voltage source, may be provided. In this case, the driving signal generation unit 20 may include switches between the voltage sources 111 and 112 and the first through n-th driving electrodes $d_1$ through and $d_n$, and may generate pulse-type driving signals in response to the switches being turned on or off.

Signals of the voltage sources (111 and 112) may be provided to the code generator 120. The code generator 120 modifies the signals provided by the voltage sources (111 and 112) using a circulation matrix input thereto, and applies the modified signals to the driving lines. For example, in an exemplary embodiment, the code generator receives a signal from at least one of the voltage sources 111 and 112, and divides the signal into a plurality of driving signals.

Figure 3:
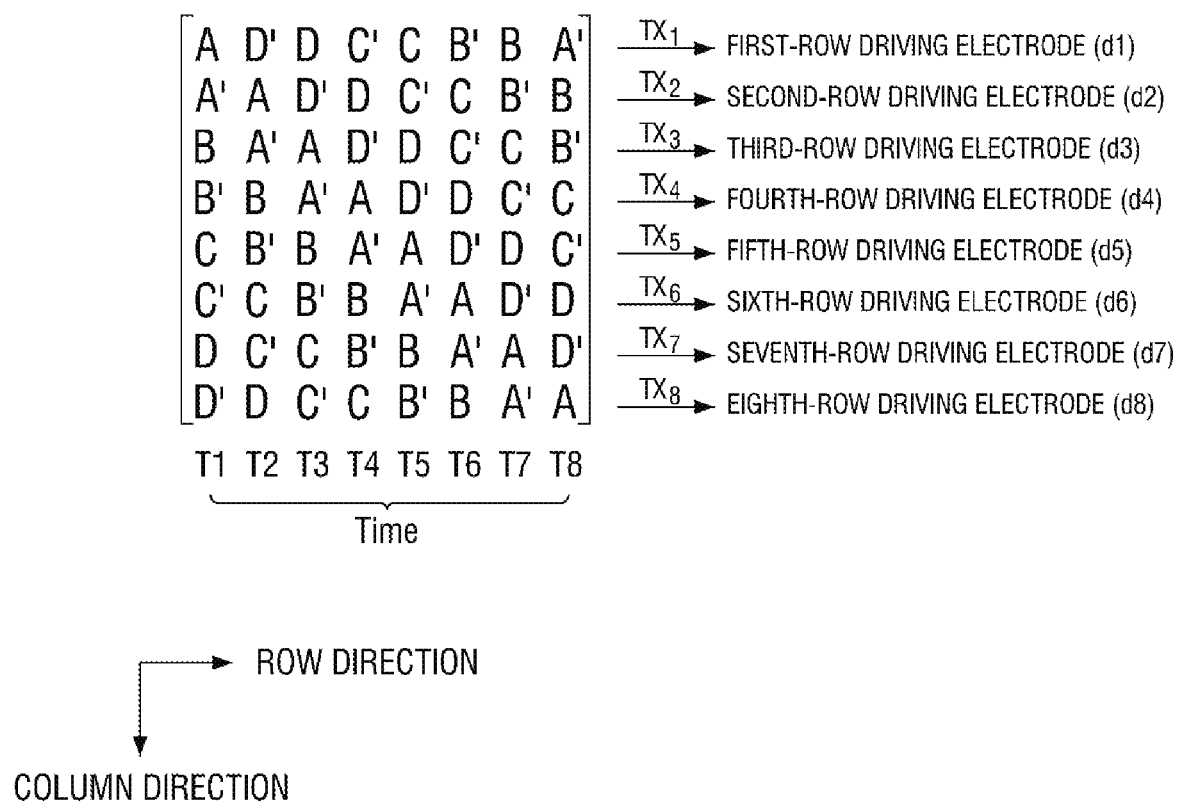
FIG. 3 is a schematic view showing a circulation matrix input to a code generator of FIG. 2.

FIG. 3 is a schematic view showing the circulation matrix input to the code generator of FIG. 2.

For convenience of description, the terms column direction and row direction are used in this specification. The column direction refers to the vertical direction in the drawings, and the row direction refers to the horizontal direction in the drawings. FIG. 3 shows an 8-bit matrix. However, exemplary embodiments of the present disclosure are not limited thereto. For example, according to exemplary embodiments, matrices based on various bit quantities such as 4 bits, 16 bits, 32 bits, or 64 bits may be used depending on the size of the touch panel and the number of driving electrodes provided in the touch panel.

For example, referring to FIG. 3, the circulation matrix input to the code generator 120 may be an 8-bit matrix and may consist of eight variables, e.g., A, A', B, B', C, C', D, and D'.

Variable A' is the reverse phase of variable A, which is a positive phase, variable B' is the reverse phase of variable B, which is a positive phase, variable C' is the reverse phase of variable C, which is a positive phase, and variable D' is the reverse phase of variable D, which is a positive phase. Each of the variables of the circulation matrix may satisfy orthogonality. The term "positive phase", as used herein, refers to the phase of a non-zero signal output to have a sign intended by each variable, and the term "reverse phase", as used herein, refers to the phase of a signal having the opposite sign to a positive-phase signal. In exemplary embodiments, the result of adding up a positive-phase signal and a reverse-phase signal having the same magnitude as, but an opposite sign to, the positive-phase signal, is equal to zero.

Orthogonality refers to the characteristic of each variable that outputs a value of 1 when subjected to a digital logic operation (or analog-to-digital conversion and then a digital logic operation) together with another variable of its kind, and outputs a value of 0 when subjected to a digital logic operation (or analog-to-digital conversion and then a digital logic operation) together with another variable of a different kind.

The code generator 120 may include a first code generator 121 (also referred to as a first code generator circuit) and a second code generator 122 (also referred to as a second code generator circuit). The first code generator 121 may output the positive-phase signal of each variable input to the code generator 120, and the second code generator 122 may output the reverse-phase signal of each variable input to the code generator 120.

The sensing nodes of the touch sensing unit 10 may correspond to the variables of the circulation matrix. The circulation matrix may be repeatedly applied along the row direction. For example, the 8-bit circulation matrix may be repeatedly applied to sensing nodes in first through eighth columns first, and then to sensing nodes in ninth through sixteenth columns.

The 8-bit circulation matrix may be divided into eight time zones, e.g., first through eighth time zones T1 through T8. The eight columns of variables of the circulation matrix correspond to the eight time zones. For example, the first column of variables ranging from variable A in the first row and the first column of the circulation matrix to variable D' in the eighth row and the first column of the circulation matrix are variables producing signals to be applied to the first through n-th driving electrodes $d_1$ through $d_n$ in the first time zone T1.

Signals generated by each row of variables of the circulation matrix may be applied to a driving electrode in a corresponding row. For example, in the first time zone T1, a code signal $TX_1$ generated by variable A in the first row is applied to a first-row driving electrode (e.g., the first driving electrode $d_1$), and in the eighth time zone T8, a code signal $TX_8$ generated by variable D' in the eighth row is applied to an eighth-row driving electrode (e.g., the eighth driving electrode $d_8$).

FIG. 4 is a timing diagram showing the waveforms, during each time zone, of driving signals generated by the code generator of FIG. 2.

Referring to FIGS. 3 and 4, during a period T, the first through eighth driving signals $TX_1$ through $TX_8$ of FIG. 3 are applied to first through eighth-row driving electrodes (e.g., the first through eighth driving electrodes $d_1$ through $d_8$). The signals shown in FIG. 3 are merely exemplary, and the first through eighth driving signals $TX_1$ through $TX_8$, which are generated by the circulation matrix, are not limited thereto.

During each time zone, four pairs of signals having a positive phase and a reverse phase are applied to the first through eighth driving electrodes $d_1$ through $d_8$ at the same time as the first through eighth driving signals $TX_1$ through $TX_8$. For example, in the first time zone T1, a pair of signals corresponding to variables A and A', a pair of signals corresponding to variables B and B', a pair of signals corresponding to variables C and C', and a pair of signals corresponding to variables D and D' are applied to the first through eighth driving electrodes $d_1$ through $d_8$ at the same time.

Referring to FIGS. 1, 3, and 4, during each time zone, the first through eighth driving signals $TX_1$ through $TX_8$ are applied to all of the first through eighth driving electrodes $d_1$ through $d_8$. For example, in the first time zone T1, the signal corresponding to variable A is applied to the first driving electrode $d_1$, the signal corresponding to variable A' is applied to the second driving electrode $d_2$, the signal corresponding to variable B is applied to the third driving electrode $d_3$, the signal corresponding to variable B' is applied to the fourth driving electrode $d_4$, the signal corresponding to variable C is applied to the fifth driving electrode $d_5$, the signal corresponding to variable C' is applied to the sixth driving electrode $d_6$, the signal corresponding to variable D is applied to the seventh driving electrode $d_7$, and the signal corresponding to variable D' is applied to the eighth driving electrode $d_8$.

The signals applied to the first through eighth driving electrodes $d_1$ through $d_8$ are applied to the first through m-th sensing electrodes $s_1$ through $s_m$ via the sensing nodes. Since the first sensing electrode $s_1$ intersects all of the first through eighth driving electrodes $d_1$ through $d_8$, the first sensing electrode $s_1$ receives a signal corresponding to the sum of the first through eighth driving signals $TX_1$ through $TX_8$ applied to the first through eighth driving electrodes $d_1$ through $d_8$, and transmits the received signal to the sensing unit 30. For example, in the first time zone T1, the first sensing electrode $s_1$ receives a signal corresponding to the sum of the signals received by the first through eighth driving electrodes $d_1$ through $d_8$ (e.g., the sum of the signals corresponding to variables A, A', B, B', C, C', D, and D'), and transmits the received signal to the sensing unit 30.

During each time zone, four pairs of signals having opposite phases (e.g., A and A') are applied to the first through eighth driving electrodes $d_1$ through $d_8$. Thus, the signal transmitted by the first sensing electrode $s_1$ to the sensing unit 30 during each time zone is zero.

Accordingly, in an exemplary embodiment, in the first time zone T1, the sum of the signals applied to the first sensing electrode $s_1$ and the signal transmitted by the first sensing electrode $s_1$ to the sensing unit 30 satisfy Equation 1 below.

$$T1: V_A + V_{A'} + V_B + V_{B'} + V_C + V_{C'} + V_D + V_{D'} = 0 \quad \text{[Equation 1]}$$

Referring to Equation 1, $V_k$ denotes a driving signal corresponding to variable k (k=A, A', B, B', C, C', D, or D'). As is apparent from Equation 1, the sum of the signals applied to the first sensing electrode $s_1$ and the signal transmitted by the first sensing electrode $s_1$ to the sensing unit 30 are both zero.

FIGS. 3 and 4 show 8-bit matrix signals, but an N-bit signal that can be applied to the first sensing electrode $s_1$ may be represented by Equation 2 below.

$$Ti: V_1 + V_{1'} + V_2 + V_{2'} + \cdots + V_{(\frac{N}{2})} + V_{(\frac{N}{2})'} = \quad \text{[Equation 2]}$$
$$\sum_{j=1}^{N/2} V_j + V_{j'} = 0$$

Referring to Equation 2, N is an even natural number, Ti denotes an i-th time zone, $V_3$ denotes a signal received from a (2j-1)-th row driving electrode, and $V_{j'}$ denotes a signal received from a 2j-th row driving electrode and having an opposite phase to the signal $V_j$. As shown in Equation 2, the sum of the signals applied to the first through n-th driving electrodes $d_1$ through $d_1$, during the i-th time zone Ti, and the signal $RX_1$ transmitted by the first sensing electrode $s_1$ to the sensing unit 30, both become zero.

By setting the sum of the signals received from the first through n-th driving electrodes $d_1$ through $d_n$ to zero, AC offsets that may be caused by the first through n-th driving signals $TX_1$ through $TX_n$ and may be transmitted to the sensing unit 30 can be set to almost zero. Accordingly, the presence of a touch input can be precisely determined. For example, according to exemplary embodiments, by configuring a touch panel such that driving signals have voltages that are not equal to zero during a first time zone, and such that the sum of driving signals generated at the same time is maintained to be equal to zero during the first time zone, offsets are reduced. As a result, a touch input can be more accurately determined by a touch panel according to exemplary embodiments of the present disclosure as compared to a conventional touch panel.

For example, each of the first through n-th driving signals $TX_1$ through $TX_n$, which are output by the driving signal generation unit 20, may include ideal pure signal components, direct current (DC) offsets, and AC offsets. DC offsets have a different frequency from original signal components, and thus can be easily separated from output signals. However, AC offsets have the same frequency as original signal components, and thus cannot be as easily separated from output signals. Thus, since the AC offsets of the first through n-th driving signals $TX_1$ through $TX_n$ can be set to almost zero, original signal components can be easily sensed by the touch sensing unit 10.

Referring again to FIG. 2, the driving analog multiplexer 130 may receive at least two of the signals output by the code generator 120 and may output one of the received signals in receipt of a value of 0 or 1. For example, a first driving analog multiplexer 131 may receive the output signals of the first and second code generators 121 and 122, may output the output signal of the first code generator 121 in response to the receipt of a value of 0, and may output the output signal of the second code generator 122 in response to the receipt of a value of 1. Similarly, a second driving analog multiplexer 132 may receive the output signals of third and fourth code generators 123 and 124, may output the output signal of the third code generator 123 in response to the receipt of a value of 0, and may output the output signal of the fourth code generator 124 in response to the receipt of a value of 1.

The cell delay element 140 corrects mismatches caused by delays between signals output by the driving analog multiplexer 130. The cell delay element 140 applies the first through n-th driving signals $TX_1$ through $TX_n$ with such delay-caused mismatches corrected to the first through n-th driving electrodes $d_1$ through $d_n$.

Figure 5:
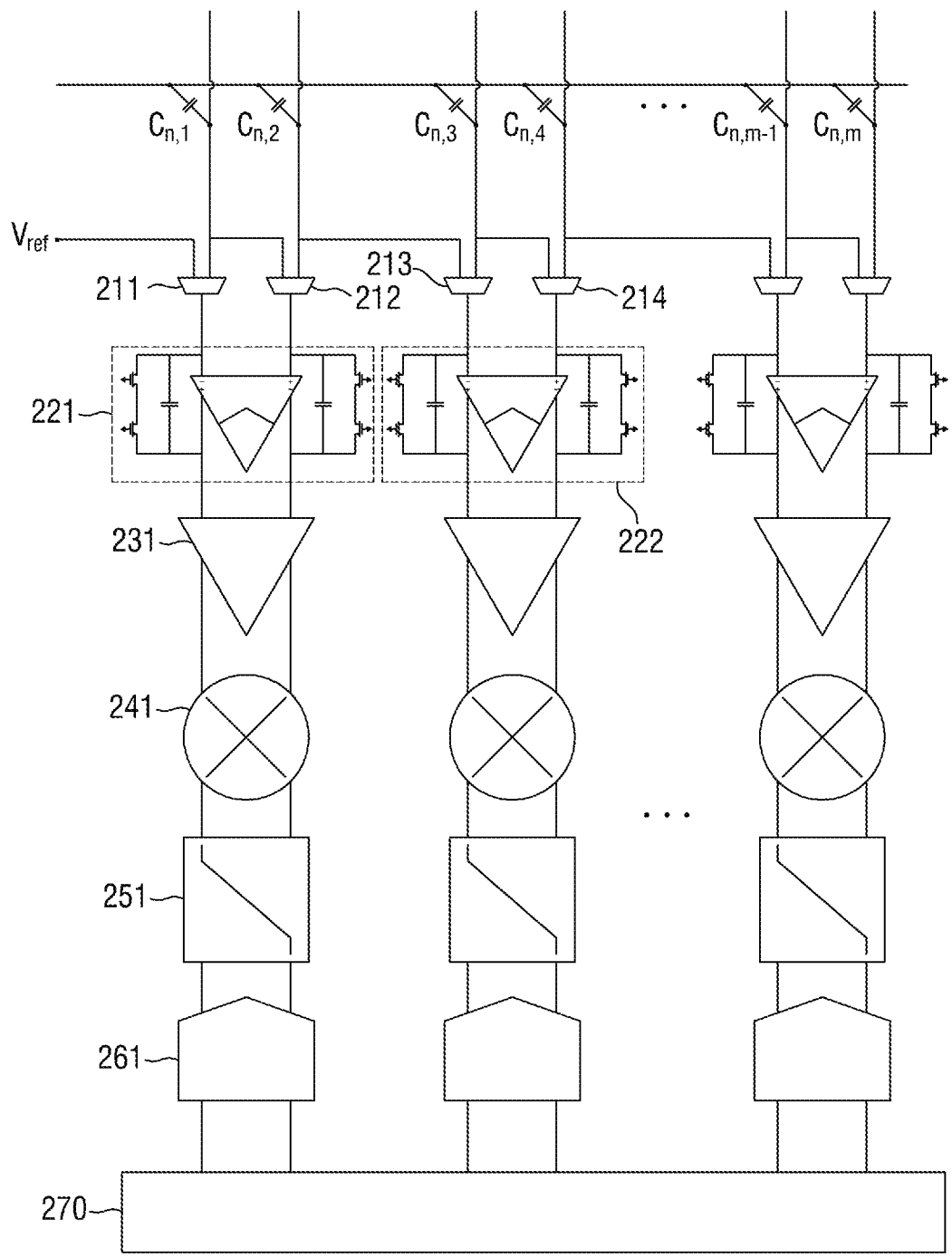
FIG. 5 is a circuit diagram of an exemplary sensing unit of the touch panel of FIG. 1.

FIG. 5 is a circuit diagram of an exemplary sensing unit of the touch panel of FIG. 1. FIGS. 6A to 6D are graphs showing sensing signals and noise signals that have passed through each element of the sensing unit of FIG. 5.

For example, FIGS. 6A, 6B, 6C, and 6D show the variations, with frequency, of a sensing signal "Signal" and noise ($N_{flicker}$, $N_{display}$, $N_{lamp}$, and $N_{white}$) at differential charge amplifiers 221 and 222, at differential gain amplifiers 231, at mixers 241, and at low pass filters 251, respectively.

Referring to FIGS. 5 and 6A to 6D, the sensing unit 30 receives the first through m-th sensing signals $RX_1$ through $RX_m$ generated by the first through m-th sensing electrodes $s_1$ through $s_m$. The sensing unit 30 includes sensing analog multiplexers 211 through 214, the differential charge amplifiers 221 and 222, the differential gain amplifiers 231, the mixers 241, the low-pass filters 251, analog-to-digital converters (ADCs) 261, and a touch processor 270.

The sensing analog multiplexers 211 through 214 may receive at least two signals from among the first through m-th sensing signals $RX_1$ through $RX_m$ and a reference output signal $V_{ref}$, and may output one of the received signals in response to the receipt of a value of 0 or 1. For example, the sensing analog multiplexer 211 may receive the reference output signal $V_{ref}$ and the first sensing signal $RX_1$, may output the reference output signal $V_{ref}$ in response to the receipt of a value of 0, and may output the first sensing signal $RX_1$ in response to the receipt of a value of 1. The sensing analog multiplexer 212 may receive the first and second sensing signals $RX_1$ and $RX_2$, may output the first sensing signal $RX_1$ in response to the receipt of a value of 0, and may output the second sensing signal $RX_2$ in response to the receipt of a value of 1.

Sensing signals output by the analog multiplexers 211 through 214 are applied to the differential charge amplifiers 221 and 222.

The differential charge amplifiers 221 and 222 serve both as differential amplifiers and as charge amplifiers.

The differential charge amplifiers 221 and 222, as charge amplifiers, amplify the output signals of the sensing analog amplifiers 211 through 214, and output the amplified signals.

The differential charge amplifiers 221 and 222, as differential amplifiers, receive two of the output signals of the sensing analog multiplexers 211 through 214, and output the difference between the received signals as a differential output signal.

For example, the differential charge amplifier 221 receives a single reference amplification output signal and the output signal of the sensing analog multiplexer 211, amplifies the difference between the two received signals, and outputs the result of the amplification as a first differential output signal.

Since the differential charge amplifiers 221 and 222 output signals in a differential manner, AC offsets can be further eliminated, and DC offsets and common noise can also be eliminated.

Since the first through n-th driving signals $TX_1$ through $TX_n$ generated during each time zone sum to zero, the differential charge amplifiers 221 and 222 may not be easily saturated by the first through m-th sensing signals $RX_1$ through $RX_m$. The differential charge amplifiers 221 and 222 may include capacitors with small capacitances. By using capacitors with small capacitances, a touch panel can be miniaturized.

Figure 6A:
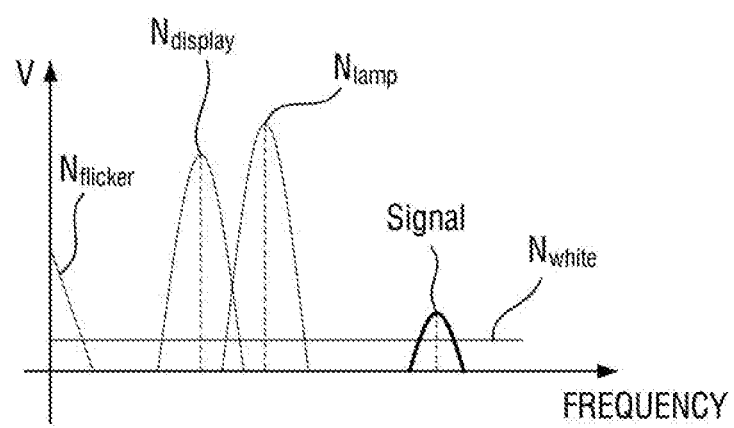
FIGS. 6A to 6D are graphs showing sensing signals and noise signals that have passed through each element of the sensing unit of FIG. 5.

The touch panel according to an exemplary embodiment may be exposed to external noise. For example, signals applied to the sensing unit 30 not only include the sensing signal "Signal", but also include various noise signals such as display noise $N_{display}$, lamp noise $N_{lamp}$, flicker noise $N_{flicker}$, and white noise $N_{white}$. The sensing unit 30 receives the mixture of the sensing signal "Signal" and the noise signals $N_{display}$, $N_{lamp}$, $N_{flicker}$, and $N_{white}$ from the touch sensing unit 10. For example, as shown in FIG. 6A, the differential charge amplifiers 221 and 222 may output the sensing signal "Signal" and the noise signals $N_{display}$, $N_{lamp}$, $N_{flicker}$, and $N_{white}$.

The output signals of the differential charge amplifiers 221 and 222 are provided to the differential gain amplifiers 231.

The differential gain amplifiers 231 selectively amplify only the sensing signal "Signal" from among the output signals of the differential charge amplifiers 221 and 222. Thus, the differential gain amplifiers 231 may serve as band pass filters.

The driving signal generation unit 20 provides driving signals that are generated by the code generator 120 during each time zone to sum to zero, and the sensing unit 30 receives sensing signals corresponding to the driving signals. Thus, the sensing signal "Signal" may be weak. In order for the sensing signal "Signal" to be distinguishable from the noise signals $N_{display}$, $N_{lamp}$, $N_{flicker}$, and $N_{white}$, the differential gain amplifiers 231 selectively amplify only the sensing signal "Signal".

Figure 6B:
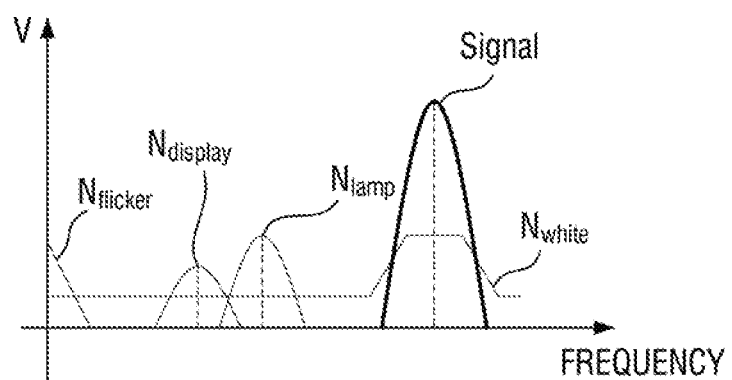

For example, as shown in FIG. 6B, the differential gain amplifiers 231 amplify signals in the frequency band of the sensing signal "Signal" and attenuate signals in other frequency bands where the noise signals $N_{display}$, $N_{lamp}$, $N_{flicker}$, and $N_{white}$ exist.

The output signals of the differential gain amplifiers 231 are applied to the mixers 241.

The mixers 241 modify the frequency of the output signals of the differential gain amplifiers 231. For example, the mixers 241 may serve as phase shifters that modify the frequency of signals.

Figure 6C:
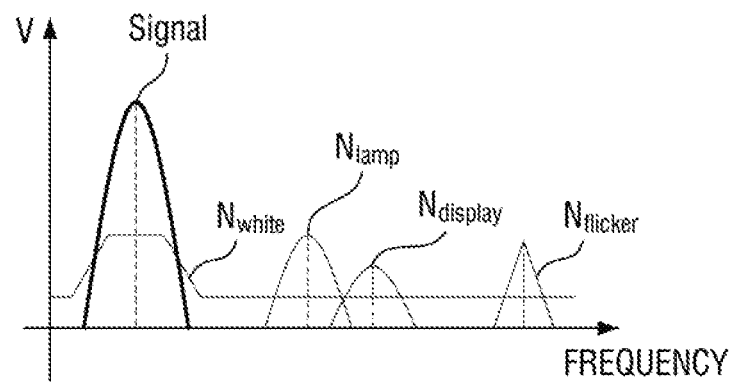

For example, as shown in FIG. 6C, the mixers 241 may convert the sensing signal "Signal", which resides in a high-frequency band, to a low-frequency band, and may convert the noise signals $N_{display}$, $N_{lamp}$, $N_{flicker}$, and $N_{white}$, which reside in a relatively low frequency band, to a high-frequency band.

The output signals of the mixers 241 are applied to the low pass filters 251.

The low pass filters 251 may filter out the noise signals $N_{display}$, $N_{lamp}$, $N_{flicker}$, and $N_{white}$ present in a high-frequency band.

Figure 6D:
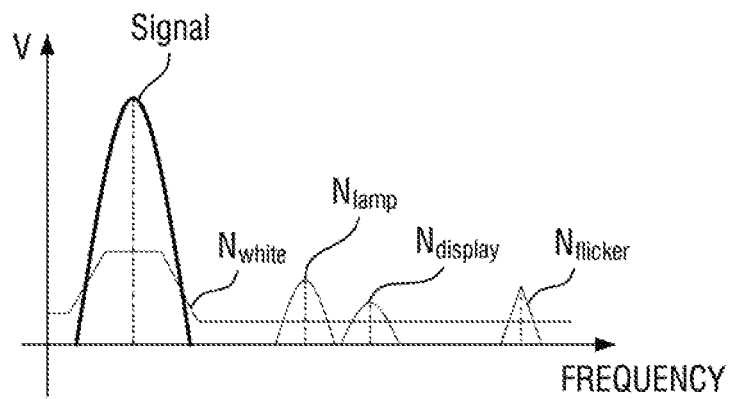

For example, as shown in FIG. 6D, the sensing signal "Signal" present in a relatively low-frequency band may be selectively output, and the noise signals $N_{display}$, $N_{lamp}$, $N_{flicker}$, and $N_{white}$ present in a relatively high-frequency band may be filtered out.

As described above, the differential gain amplifiers 231, the mixers 241, and the low pass filters 251 may serve as filters for eliminating the noise signals $N_{display}$, $N_{lamp}$, $N_{flicker}$, and $N_{white}$ so as to restore only the original signal modulated by the driving signal generation unit 20 (e.g., the sensing signal "Signal") from among all of the signals applied to the sensing unit 30. Since the noise signals $N_{display}$, $N_{lamp}$, $N_{flicker}$, and $N_{white}$ can be filtered out by these filters, signal-to-noise ratio (SNR) can be improved.

The output signals of the low pass filters 251 are applied to the ADCs 261.

The ADCs 261 convert analog signals applied thereto into digital signals, and apply the digital signals to the touch processor 270.

The touch processor 270 modulates a touch signal using the digital signals applied thereto by the ADCs 261.

A method to modulate a touch signal according to an exemplary embodiment of the present disclosure will hereinafter be described.

The touch panel according to an exemplary embodiment includes a plurality of differential charge amplifiers (e.g., the differential charge amplifiers 221 and 222). As described above with reference to FIGS. 5 and 6A to 6D, the differential charge amplifiers 221 and 222 may amplify the first through m-th sensing signals $RX_1$ through $RX_m$ output by the first through m-th sensing electrodes $s_1$ through $s_m$, or may receive two signals from among the first through m-th sensing signals $RX_1$ through $RX_m$ and a reference output signal and output the difference between the two received signals as a differential output signal.

For example, the first sensing analog multiplexer 211 may receive the reference output signal and may output the reference output signal as an output signal $a_0$, the second sensing analog multiplexer 212 may receive the first sensing signal $RX_1$ and may output the first sensing signal $RX_1$ as an output signal $a_1$, and the first differential charge amplifier 221 may receive the output signals $a_0$ and $a_1$ from the first and second sensing analog multiplexers 211 and 212, respectively, and may output the difference between the output signals $a_0$ and $a_1$ as a first differential output signal $b_1$ ($b_1 = a_1 - a_0$).

For example, the third sensing analog multiplexer 213 may receive the first sensing signal $RX_1$ as the output signal $a_1$, the fourth sensing analog multiplexer 214 may receive the second sensing signal $RX_2$ as an output signal $a_2$, and the second differential charge amplifier 222 may receive the output signals $a_1$ and $a_2$ from the third and fourth sensing analog multiplexers 213 and 214, respectively, and may output the difference between the output signals $a_1$ and $a_2$ as a second differential output signal $b_2$ ($b_2=a_2-a_1$).

Similarly, an n-th differential charge amplifier may receive output signals $a_{n-1}$ and $a_n$ output by (n−1)-th and n-th sensing analog multiplexers, respectively, and may output the difference between the output signals $a_{n-1}$ and $a_n$ as an n-th differential output signal $b_2$ ($b_2=a_n-a_{n-1}$).

For example, the differences between the output signals of pairs of adjacent sensing electrodes may be output as the first, second, ..., and n-th differential output signals $b_1$, $b_2$, ..., and $b_n$, as indicated by Equation 3 below.

$$b_1 = a_1 - a_0$$
$$b_2 = a_2 - a_1$$
$$b_3 = a_3 - a_2$$
$$\ldots$$
$$b_n = a_n - a_{n-1}$$
[Equation 3]

The output signals $a_1$, $a_2$, $a_3$, ..., and $a_n$ may be represented by using the first, second, ..., and n-th differential output signals $b_1$, $b_2$, ..., and $b_n$ and the reference output signal $a_0$, as indicated by Equation 4 below.

$$a_1 = a_0 + b_1$$
$$a_2 = a_1 + b_2 = a_0 + (b_1 + b_2)$$
$$a_3 = a_2 + b_3 = a_0 + (b_1 + b_2 + b_3)$$
$$\ldots$$
$$a_n = a_0 + (b_1 + \cdots + b_n)$$
[Equation 4]

The touch processor 270 may obtain a single output signal $a_k$ using the reference output signal $a_0$ and the first through k-th differential output signals $b_1$ through $b_k$, as indicated by Equation 5 below.

$$a_k = a_0 + (b_1 + \cdots + b_k) = a_0 + \sum_{n=1}^{k} b_n$$
[Equation 5]

In a case in which the touch panel according to an exemplary embodiment is driven in a differential amplification sensing manner, the sensing signals (or single output signals) output by the sensing electrodes of the touch panel can be restored. Thus, a multi-touch input generated by touching multiple nodes on the touch panel according an exemplary embodiment for fingerprint recognition can be recognized. Also, variations in the capacitances of the sensing capacitors $C_{1,1}$ through $C_{n,m}$ can be recognized using the first, second, ..., and n-th differential output signals $b_1$, $b_2$, ..., and $b_n$ and the reference output signal $a_0$.

The first through eighth driving electrodes $d_1$ through $d_8$, which are input in accordance with the circulation matrix of FIG. 3, may be disposed in the horizontal direction of the touch panel according to an exemplary embodiment, and a k-th sensing electrode $s_k$ may be disposed perpendicularly to the first through eighth driving electrodes $d_1$ through $d_8$. First sensing capacitance $C_{1k}$ may be generated between the first driving electrode $d_1$ and the k-th sensing electrode $s_k$, second sensing capacitance $C_{2k}$ may be generated between the second driving electrode $d_2$ and the k-th sensing electrode $s_k$, third sensing capacitance $C_{3k}$ may be generated between the third driving electrode $d_3$ and the k-th sensing electrode $s_k$, fourth sensing capacitance $C_{4k}$ may be generated between the fourth driving electrode $d_4$ and the k-th sensing electrode $s_k$, fifth sensing capacitance $C_{5k}$ may be generated between the fifth driving electrode $d_5$ and the k-th sensing electrode $s_k$, sixth sensing capacitance $C_{6k}$ may be generated between the sixth driving electrode $d_6$ and the k-th sensing electrode $s_k$, seventh sensing capacitance $C_{7k}$ may be generated between the seventh driving electrode $d_7$ and the k-th sensing electrode $s_k$, and eighth sensing capacitance $C_{8k}$ may be generated between the eighth driving electrode $d_8$ and the k-th sensing electrode $s_k$.

Sensing output signals $K_1$ through $K_8$ of the k-th sensing electrode $s_k$ in the first through eighth time zones T1 through T8, respectively, may be represented by Equation 6 below.

$T_1$: $A \cdot C_{1k} + A' \cdot C_{2k} + B \cdot C_{3k} + B' \cdot C_{4k} + C \cdot C_{5k} + C' \cdot C_{6k} + D \cdot C_{7k} + D' \cdot C_{8k} = K_1$ $T_2$: $D' \cdot C_{1k} + A \cdot C_{2k} + A' \cdot C_{3k} + B \cdot C_{4k} + B' \cdot C_{5k} + C \cdot C_{6k} + C' \cdot C_{7k} + D \cdot C_{8k} = K_2$ $T_3$: $D \cdot C_{1k} + D' \cdot C_{2k} + A \cdot C_{3k} + A'' \cdot C_{4k} + B \cdot C_{5k} + B' \cdot C_{6k} + C \cdot C_{7k} + C' \cdot C_{8k} = K_3$ $T_4$: $C' \cdot C_{1k} + D \cdot C_{2k} + D' \cdot C_{3k} + A \cdot C_{4k} + A' \cdot C_{5k} + B \cdot C_{6k} + B' \cdot C_{7k} + C \cdot C_{8k} = K_4$ $T_5$: $C \cdot C_{1k} + C' \cdot C_{2k} + D \cdot C_{3k} + D' \cdot C_{4k} + A \cdot C_{5k} + A' \cdot C_{6k} + B \cdot C_{7k} + B' \cdot C_{8k} = K_5$ $T_6$: $B' C_{1k} + C \ C'_{2k} + C' \cdot C_{3k} + D \cdot C_{4k} + D' \cdot C_{5k} + A \cdot C_{6k} + A' \cdot C_{7k} + B' \cdot C_{8k} = K_6$ $T_7$: $B \cdot C_{1k} + B' \cdot C_{2k} + C \cdot C_{3k} + C' \cdot C_{4k} + D \cdot C_{5k} + D' \cdot C_{6k} + A \cdot C_{7k} + A' \cdot C_{8k} = K_7$ $T_8$: $A' \cdot C_{1k} + B \cdot C_{2k} + B' \cdot C_{3k} + C \cdot C_{4k} + C' \cdot C_{5k} + D \cdot C_{6k} + D' \cdot C_{7k} + A \cdot C_{8k} = K_8$
[Equation 6]

The first through eighth sensing capacitances $C_{1k}$ through $C_{8k}$ between the k-th sensing electrode $s_k$ and the first through eighth driving electrodes $d_1$ through $d_8$ may be modulated or demodulated using driving signals (e.g., variables A, A', B, B', C, C', D, and D'), and the sensing output signals $K_1$ through $K_8$. The touch processor 270 may calculate the sensing capacitances of the sensing nodes using variables A, A', B, B', C, C', D, and D' and the sensing output signals $K_1$ through $K_8$. For example, the first through eighth sensing capacitances $C_{1k}$ through $C_{8k}$ between the k-th sensing electrode $s_k$ and the first through eighth driving electrodes $d_1$ through $d_8$ may be calculated using Equations 7 and 8 below.

$$H = \begin{bmatrix} A & A' & B & B' & C & C' & D & D' \\ D' & A & A' & B & B' & C & C' & D \\ D & D' & A & A' & B & B' & C & C' \\ C' & D & D' & A & A' & B & B' & C \\ C & C' & D & D' & A & A' & B & B' \\ B' & C & C' & D & D' & A & A' & B \\ B & B' & C & C' & D & D' & A & A' \\ A' & B & B' & C & C' & D & D' & A \end{bmatrix},$$ [Equation 7]

$$X = \begin{bmatrix} C_{1k} \\ C_{2k} \\ C_{3k} \\ C_{4k} \\ C_{5k} \\ C_{6k} \\ C_{7k} \\ C_{8k} \end{bmatrix}, K = \begin{bmatrix} K_1 \\ K_2 \\ K_3 \\ K_4 \\ K_5 \\ K_6 \\ K_7 \\ K_8 \end{bmatrix}$$

$$H \times X = K$$ [Equation 8]
$$X = H^{-1} \times K$$

For example, the capacitances $C_{1k}$ through $C_{8k}$ between the k-th sensing electrode $s_k$ and the first through eighth driving electrodes $d_1$ through $d_8$ may be obtained by multiplying the reverse matrix of H, which consists of variables A, A', B, B', C, C', D, and D', by the sensing output signals $K_1$ through $K_8$.

In this manner, the touch processor 270 may modulate digital values provided by the ADCs 261 into capacitance information of the sensing capacitors $C_{1,1}$ through $C_{n,m}$ at the sensing nodes of the touch panel according to an exemplary embodiment.

The touch panel according to exemplary embodiments can be applied to a touch screen device, a fingerprint sensor, etc.

Figure 7:
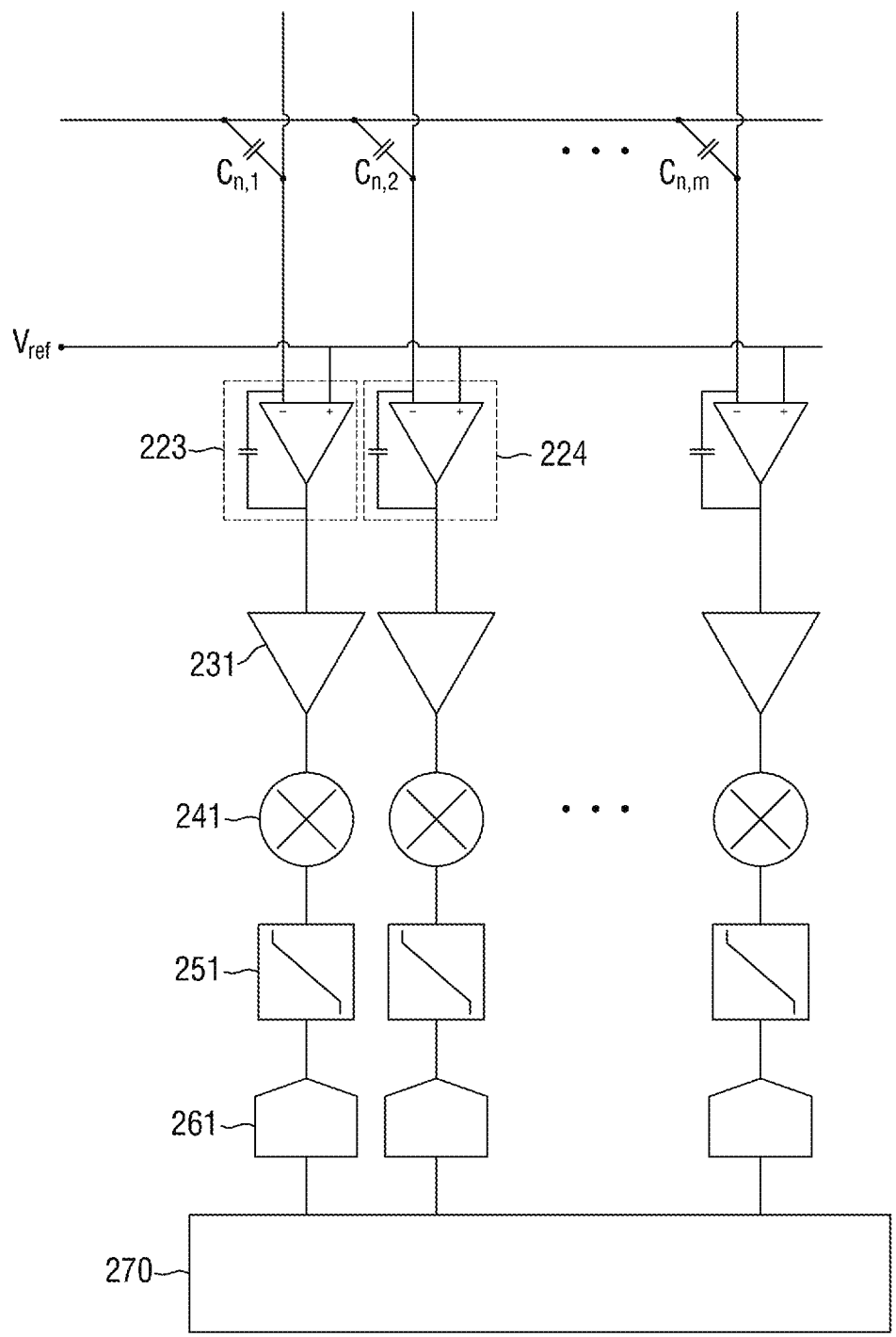
FIG. 7 is a circuit diagram of an exemplary sensing unit of the touch panel of FIG. 1.

FIG. 7 is a circuit diagram of an exemplary sensing unit of the touch panel of FIG. 1.

The sensing unit 30 of FIG. 7 differs from the sensing unit 30 of FIG. 5 in that the sensing analog multiplexers 211, 212, 213, and 214 are not included, and in that single-ended charge amplifiers 223 and 224 are included instead of the differential charge amplifiers 221 and 222.

The single-ended charge amplifiers 223 and 224 may be switched capacitor amplifiers.

For example, a plurality of sensing signals $RX_1$ through $RX_m$ provided by a plurality of sensing electrodes $s_1$ through $s_m$ may be applied directly to the single-ended charge amplifiers 223 and 224 without passing through the sensing analog multiplexers 211, 212, 213, and 214.

During each time zone, a plurality of driving signals $TX_1$ through $TX_n$ are applied to the first through m-th sensing electrodes $s_1$ through $s_m$ such that they sum to zero. Thus, in an exemplary embodiment, the single-ended charge amplifiers 223 and 224, which have a predetermined capacitance, are not easily saturated by the sum of the first through n-th driving signals $TX_1$ through $TX_n$. For example, the single-ended charge amplifiers 223 and 224, which have small capacitances, are used instead of the differential charge amplifiers 221 and 222, and even if the single-ended charge amplifiers 223 and 224 are used, a touch panel still can be miniaturized.

The output signals of the single-ended charge amplifiers 223 and 224, like the output signals of the differential charge amplifiers 221 and 222, may be transmitted to charge gain amplifiers 231, mixers 241, low pass filters 251, ADCs 261, and a touch processor 270.

Figure 8:
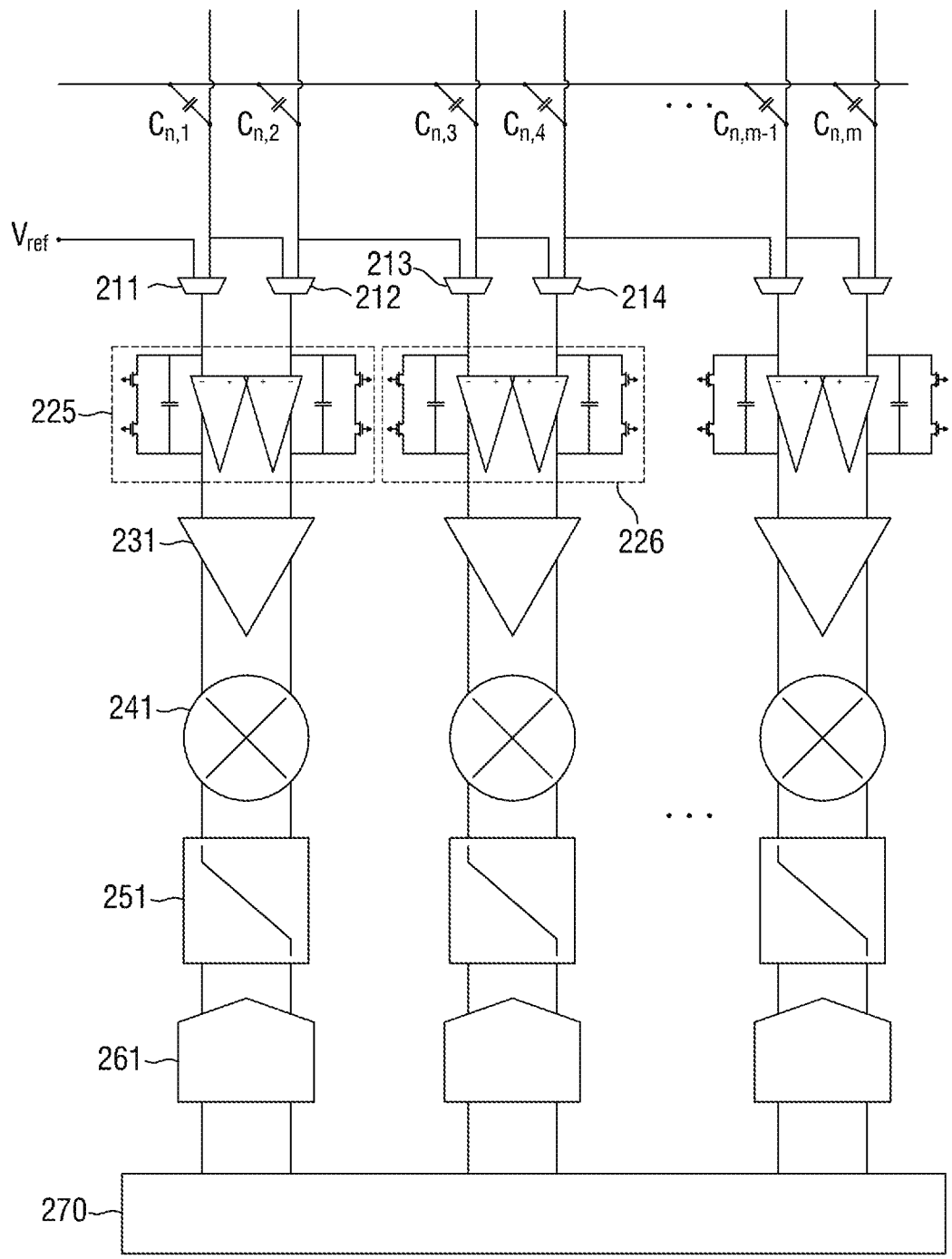
FIG. 8 is a circuit diagram of an exemplary sensing unit of the touch panel of FIG. 1.

FIG. 8 is a circuit diagram of an exemplary sensing unit of the touch panel of FIG. 1.

The sensing unit 30 of FIG. 8 differs from the sensing unit 30 of FIG. 5 in that pseudo differential charge amplifiers 225 and 226 are included instead of the differential charge amplifiers 221 and 222.

For example, the pseudo differential charge amplifiers 225 and 226 are each obtained by connecting a pair of single-ended charge amplifiers, and are configured to perform the same functions as the differential charge amplifiers 221 and 222. For example, each of the pseudo differential charge amplifiers 225 and 226 includes two single-ended charge amplifiers connected to each other. Since the pseudo differential charge amplifiers 225 and 226, like the differential charge amplifiers 221 and 222, output signals in a differential manner, AC offsets can be further eliminated, and DC offsets and common noise can also be eliminated.

Various touch panels including the touch sensing unit 10, the driving signal generation unit 20, and the sensing unit 30, and the cross-sectional structures of the various touch panels, will hereinafter be described.

Figure 9:
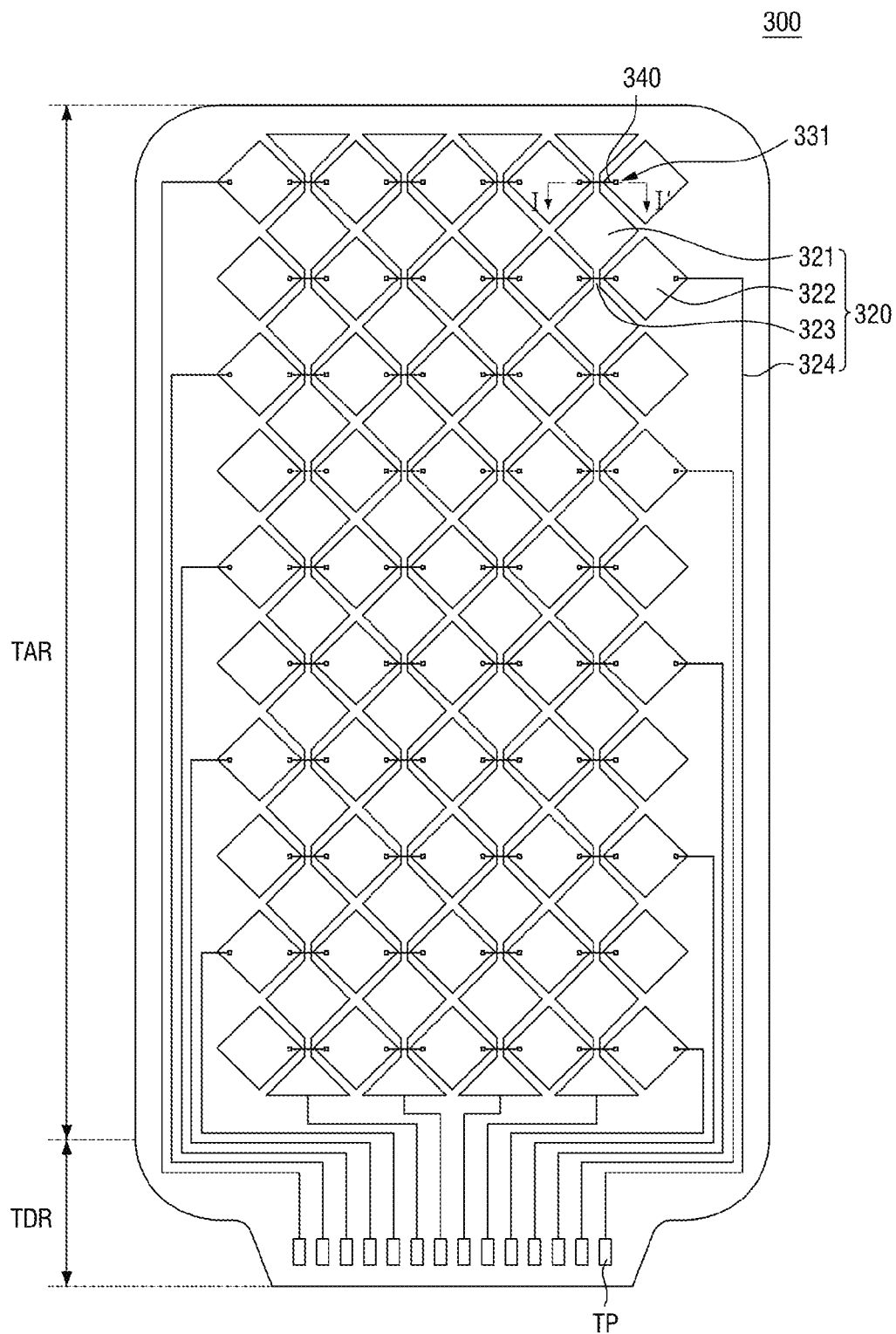
FIG. 9 is a layout view of a touch panel according to an exemplary embodiment of the present disclosure.
Figure 10:
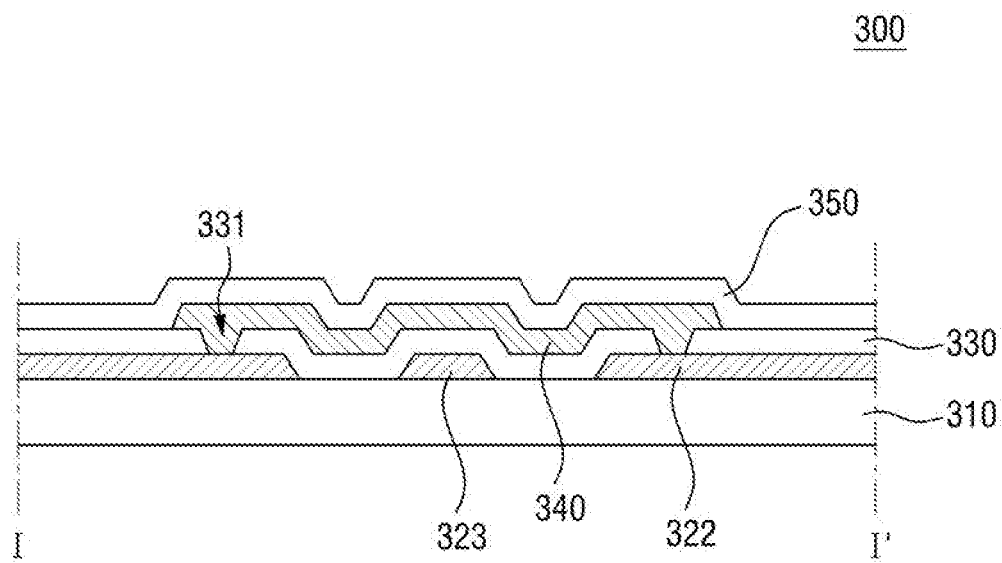
FIG. 10 is a cross-sectional view taken along line I-I' of FIG. 9.

FIG. 9 is a layout view of a touch panel according to an exemplary embodiment of the present disclosure. FIG. 10 is a cross-sectional view taken along line I-I' of FIG. 9.

Referring to FIGS. 9 and 10, a touch panel 300 includes a sensing part TAR and a pad side part TDR. In a case in which the touch panel 300 has a rectangular shape in a plan view, the touch panel 300 may have four side portions on the four sides thereof. The pad side part TDR may be disposed at a side portion of the touch panel 300 corresponding to a short side of the touch panel 300. The pad side part TDR may be disposed on one side of the sensing part TAR.

The sensing part TAR of the touch panel 300 includes a base substrate 310, a first wiring layer 320 disposed on a surface of the base substrate 310, a first insulating layer 330 disposed on the first wiring layer 320, a second wiring layer 340 disposed on the first insulating layer 330, and a second insulating layer 350 disposed on the second wiring layer 340.

The base substrate 310 may be formed of glass or plastic such as, for example, polyethylene terephthalate (PET), polyimide (PI), polycarbonate (PC), polyethylene (PE), polypropylene (PP), polysulfone (PSF), polymethyl methacrylate (PMMA), triacetyl cellulose (TAC), or a cyclo-olefin polymer (COP).

The first wiring layer 320 is disposed on one surface of the base substrate 310. The first wiring layer 320 includes a plurality of first touch electrodes 321 and a plurality of second touch electrodes 322. The first touch electrodes 321 and the second touch electrodes 322 may acquire location information of a touch input in a self-capacitance manner and/or a mutual capacitance manner.

The first touch electrodes 321 and the second touch electrodes 322 may be arranged in a matrix. The first touch electrodes 321 and the second touch electrodes 322 may be rhombus-shaped. However, exemplary embodiments of the present disclosure are not limited thereto. The first touch electrodes 321 may be electrically connected in a column direction (or in a long-side direction), and the second touch electrodes 322 may be electrically connected in a row direction (or in a short-side direction). However, exemplary embodiments of the present disclosure are not limited thereto. For example, in an exemplary embodiment, the first touch electrodes 321 may be electrically connected in the row direction, and the second touch electrodes 322 may be electrically connected in the column direction. The first touch electrodes 321 and the second touch electrodes 322 may be insulated and spaced apart from each other.

The first wiring layer 320 includes first connecting wires 323 connecting the first touch electrodes 321. The first touch electrodes 321, which are adjacent to one another in the column direction, are physically connected by the first connecting wires 323. The width of the first connecting wires 323 may be smaller than the width of the first touch electrodes 321.

The second touch electrodes 322, which are adjacent to one another in the column direction in the first wiring layer 320, may be physically separated.

The first wiring layer 320 may further include touch driving wires 324 and touch wire pads TP. The touch driving wires 324 are connected to the first touch electrodes 321 or the second touch electrodes 322 to extend to the pad side part TDR, and form the touch wire pads TP in the pad side part TDR. The touch wire pads TP may be enlarged as compared to the touch driving wires 324 to be connected to a touch printed circuit board (PCB). However, exemplary embodiments of the present disclosure are not limited thereto.

The first wiring layer 320 may be formed of a conductive material. For example, the first wiring layer 320 may include a transparent conductive oxide such as, for example, indium tin oxide (ITO), indium zinc oxide (IZO), zinc oxide (ZnO), or indium tin zinc oxide (ITZO), a metal material such as, for example, molybdenum (Mo), silver (Ag), titanium (Ti), copper (Cu), aluminum (Al), or an alloy thereof, a conductive polymer such as, for example, poly(3,4-ethylenedioxythiophene) (PEDOT), metal nanowires, carbon nanotubes, or graphene. In a case in which the first wiring layer 320 includes an opaque material, the first touch electrodes 321 and the second touch electrodes 322 may be formed in a mesh shape.

The first insulating layer 330 is disposed on the first wiring layer 320. The first insulating layer 330 may be disposed on the entire surface of the base substrate 310. The first insulating layer 330 includes contact holes 331 exposing the second touch electrodes 322.

The second wiring layer 340 is disposed on the first insulating layer 330. The second wiring layer 340 includes second connecting wires. The second connecting wires of the second wiring layer 340 electrically connect the second touch electrodes 322. The width of the second connecting wires of the second wiring layer 340 may be smaller than the width of the second touch electrodes 322. The second connecting wires of the second wiring layer 340 are electrically connected to the second touch electrodes 322 via the contact holes 331. FIG. 9 illustrates that each pair of adjacent second touch electrodes 322 are connected by a single second connecting wire, but alternatively, each pair of adjacent second touch electrodes 322 may be connected by multiple second connecting wires.

The second wiring layer 340 may include the same material as the first wiring layer 320. In an exemplary embodiment, the first wiring layer 320, which includes the first touch electrodes 321 and the second touch electrodes 322 that both have a relatively large area, may be formed of a transparent conductive oxide, and the second wiring layer 340, which includes the second connecting wires, may be formed of a metal material with a relatively low resistance, such as, for example, Mo, Ag, Ti, Cu, Al, or an alloy thereof.

The second insulating layer 350 is disposed on the second wiring layer 340. The second insulating layer 350 covers and protects the second wiring layer 340. The second insulating layer 350 may be disposed on the entire surface of the base substrate 310.

The first and second insulating layers 330 and 350 may have a single or multilayer structure. The first and second insulating layers 330 and 350 may include an inorganic material, an organic material, or a combination thereof. In an exemplary embodiment, at least one of the first and second insulating layers 330 and 350 may include an inorganic film. The inorganic film may include, for example, at least one of aluminum oxide, titanium oxide, silicon oxide, silicon oxynitride, zirconium oxide, and hafnium oxide.

In an exemplary embodiment, at least one of the first and second insulating layers 330 and 350 may include an organic film. The organic film may include, for example, at least one of an acrylic resin, a methacrylic resin, polyisoprene, a vinyl resin, an epoxy resin, a urethane resin, a cellulose resin, a siloxane resin, a polyimide resin, a polyamide resin, and a perylene resin.

The touch wire pads TP may be exposed instead of being covered by the first and second insulating layers 330 and 350, and the touch PCB may be electrically connected to the touch wire pads TP. The touch PCB may be a flexible PCB. Attachment parts disposed at one end of the touch PCB may be attached to the touch wire pads TP of the touch panel 30 via anisotropic conductive films (ASFs).

Figure 11:
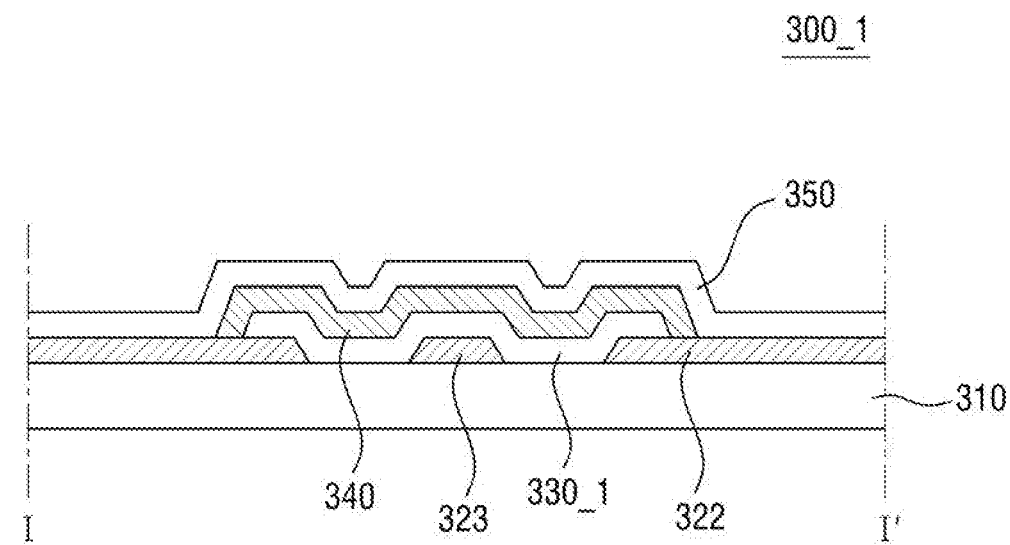
FIG. 11 is a cross-sectional view of a touch panel according to an exemplary embodiment of the present disclosure.
Figure 12:
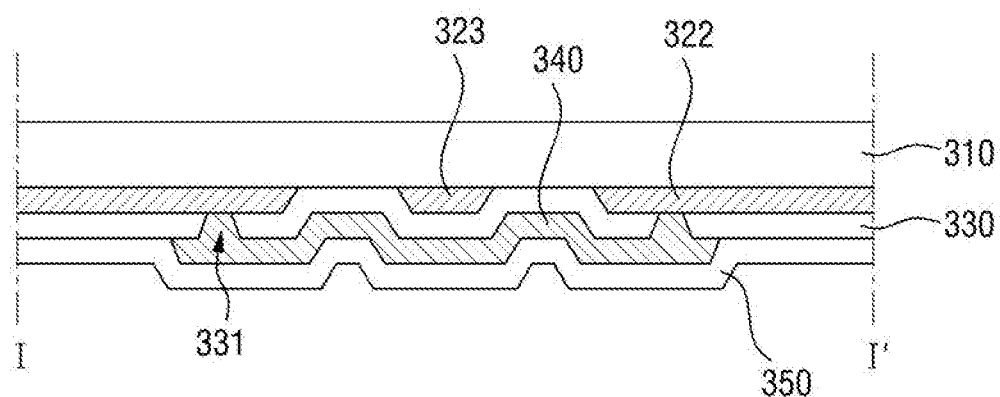
FIG. 12 is a cross-sectional view of a touch panel according to an exemplary embodiment of the present disclosure.

FIGS. 11 and 12 illustrate modified examples of the touch panel of FIGS. 9 and 10.

FIG. 11 is a cross-sectional view of a touch panel according to an exemplary embodiment of the present disclosure. Referring to FIG. 11, a touch panel 300_1 differs from the touch panel 300 in that a first insulating layer 330_1 is not disposed on the entire surface of a base substrate 310. For example, the first insulating layer 330_1 is disposed, in the shape of an island, at a part of a second wiring layer 340 where second connecting wires are formed. First connecting wires 323 of the first insulating layer 330_1 and the second connecting electrodes of the second wiring layer 340 are insulated by the first insulating layer 330_1.

FIG. 12 is a cross-sectional view of a touch panel according to an exemplary embodiment of the present disclosure. Referring to FIG. 12, the order in which a base substrate 310, a first wiring layer 320, a first insulating layer 330, a second wiring layer 340, and a second insulating layer 350 are stacked in a touch panel 300_2 is opposite to the order in which the base substrate 310, the first wiring layer 320, the first insulating layer 330, the second wiring layer 340, and the second insulating layer 350 are stacked in the touch panel 300 of FIG. 10.

Figure 13:
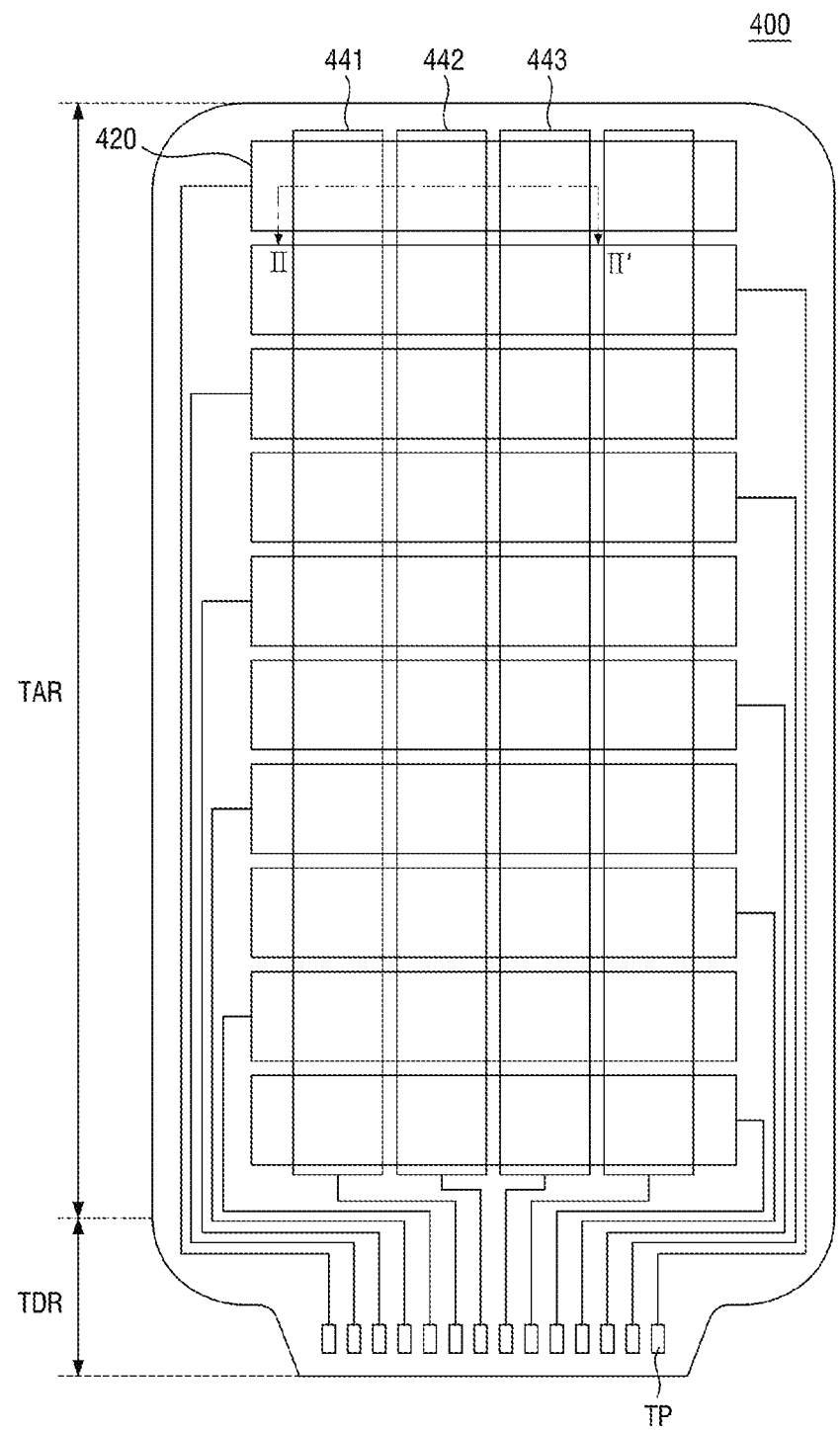
FIG. 13 is a layout view of a touch panel according to an exemplary embodiment of the present disclosure.
Figure 14:
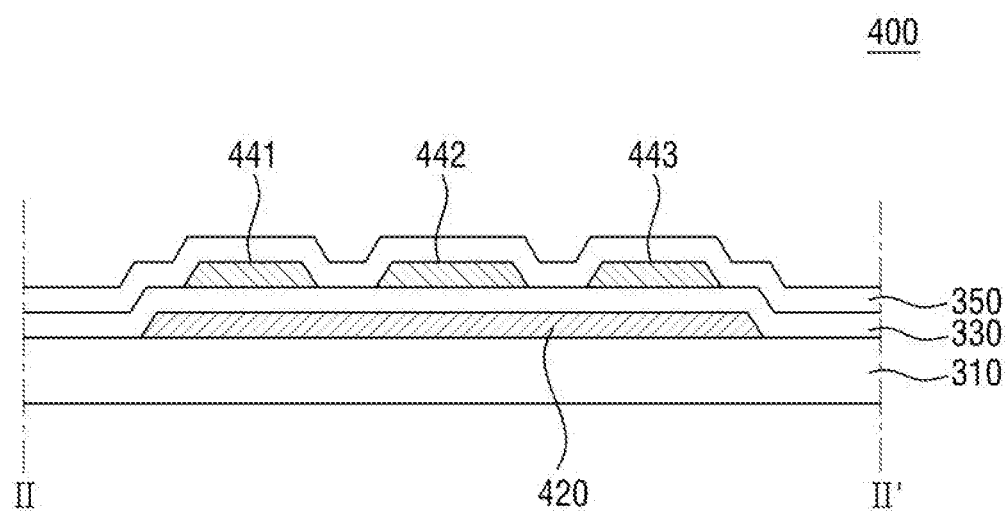
FIG. 14 is a cross-sectional view taken along line II-II' of FIG. 13.

FIG. 13 is a layout view of a touch panel according to an exemplary embodiment of the present disclosure. FIG. 14 is a cross-sectional view taken along line II-II' of FIG. 13.

Referring to FIGS. 13 and 14, a touch panel 400 differs from the touch panels 300 of FIGS. 9 and 10 in that first touch electrodes 420 are disposed in a different layer from second touch electrodes 441, 442, and 443.

A sensing part TAR of the touch panel 400 includes a base substrate 310, the first touch electrodes 420 disposed on one surface of the base substrate 310, a first insulating layer 430 disposed on the first touch electrodes 420, the second touch electrodes 441, 442, and 443 disposed on the first insulating layer 330, and a second insulating layer 350 disposed on the second touch electrodes 441, 442, and 443.

The first touch electrodes 420 and the second touch electrodes 441, 442, and 443, which intersect each other in a plan view, form capacitors. As described above, the first touch electrodes 420 and the second touch electrodes 441, 442, and 443 form sensing nodes. The first touch electrodes 420 may be driving electrodes, and the second touch electrodes 441, 442, and 443 may be sensing electrodes. However, exemplary embodiments of the present disclosure are not limited thereto.

The first touch electrodes 420 may be formed of a conductive material. For example, the first touch electrodes 420 may include a transparent conductive oxide such as, for example, ITO, IZO, ZnO, or ITZO, a metal material such as, for example, Mo, Ag, Ti, Cu, Al, or an alloy thereof, a conductive polymer such as, for example, PEDOT, metal nanowires, carbon nanotubes, or graphene.

The second touch electrodes 441, 442, and 443 may be formed of a metal material with a relatively low resistance, such as, for example, Mo, Ag, Ti, Cu, Al, or an alloy thereof.

The first touch electrodes 420 and the second touch electrodes 441, 442, and 443 may have a rectangular shape and may intersect each other in a plan view. However, exemplary embodiments of the present disclosure are not limited thereto.

Figure 15:
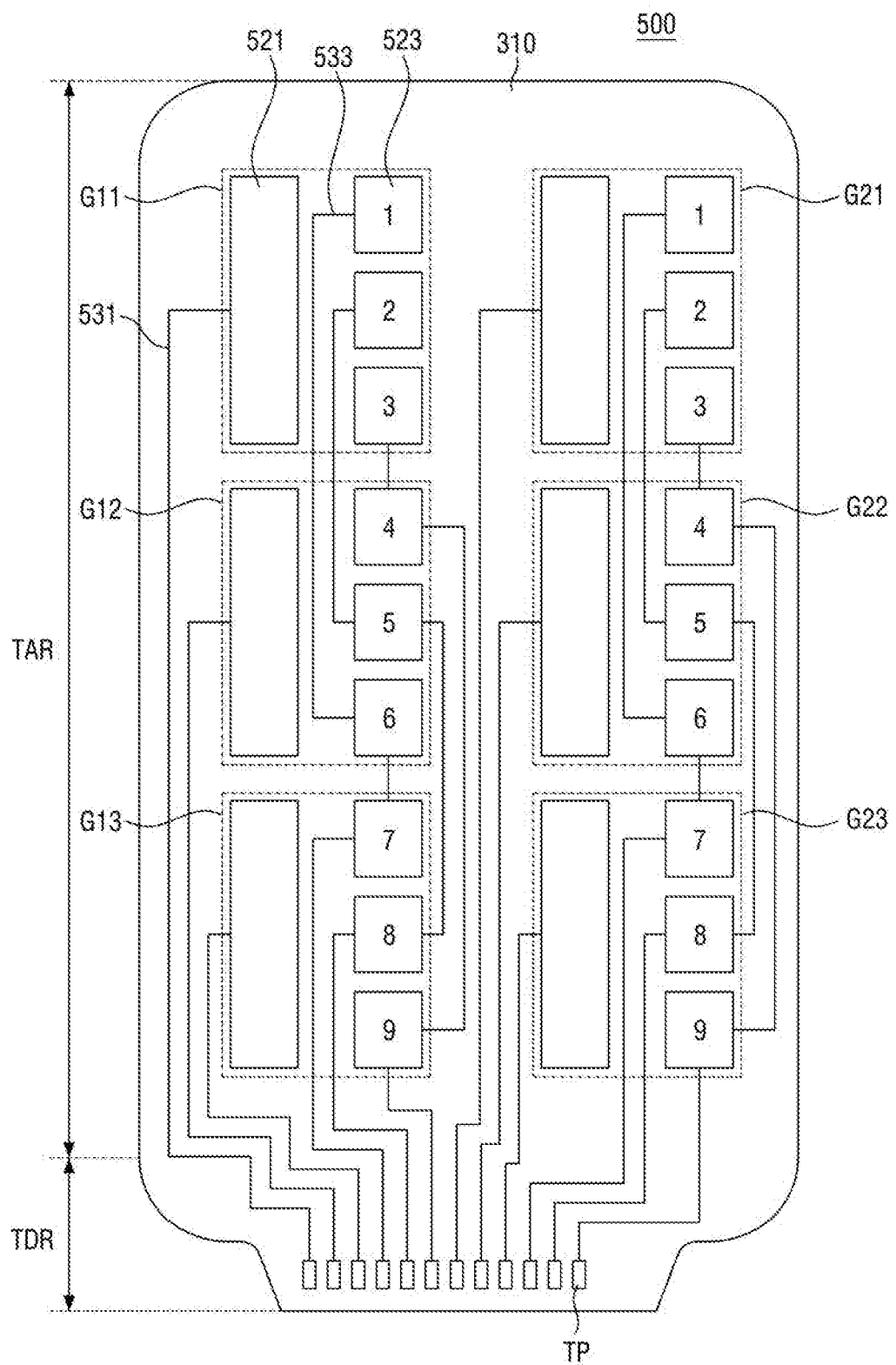
FIG. 15 is a layout view of a touch panel according to an exemplary embodiment of the present disclosure.

FIG. 15 is a layout view of a touch panel according to an exemplary embodiment of the present disclosure.

Referring to FIG. 15, a sensing part TAR of a touch panel 500 includes a base substrate 310 and a plurality of touch sensor groups which are disposed on one surface of the base substrate 310.

In some exemplary embodiments, the plurality of touch sensor groups may include a first touch sensor group G11, a second touch sensor group G12, and a third touch sensor group G13 which belong to the same column, e.g., a first column, and a fourth touch sensor group G21, a fifth touch sensor group, G22 and a sixth touch sensor group G23 which belong to a second column that is adjacent to the first column.

In some exemplary embodiments, each of the plurality of touch sensor groups may include at least one first touch electrode 521 and at least one second touch electrode 523. In some exemplary embodiments, each of the first touch sensor group G11, the second touch sensor group G12, the third touch sensor group G13, the fourth touch sensor group G21, the fifth touch sensor group G22, and the sixth touch sensor group G23 may include one first touch electrode 521 and three second touch electrodes 523.

In some exemplary embodiments, the first touch electrodes 521 and the second touch electrodes 523 may disposed on a same layer and are made of a same material. The first touch electrodes 521 and the second touch electrodes 523 may be formed of the same conductive layer. For example, the first touch electrodes 521 and the second touch electrodes 523 may consist of a single layer structure.

In some exemplary embodiments, the first touch electrodes 521 may be connected independently to their respective first wires 531.

In some exemplary embodiments, one of the three second touch electrodes 523 of the first touch sensor group G11, one of the three second touch electrodes 523 of the second touch sensor group G12, and one of the three second touch electrodes 523 of the third touch sensor group G13 may be connected to one another via a second wire 533.

For example, in the first column, a second touch electrode 523 in a first row may be connected to a second touch electrode 523 in a sixth row via respective one of second wires 533, and the second touch electrode 523 in the sixth row may be connected to a second touch electrode 523 in a seventh row via respective one of the second wires 533. Also, in the first column, a second touch electrode 523 in a second row and a second touch electrode 523 in a fifth row may be connected to each other via respective one of the second wires 533, and the second touch electrode 523 in the fifth row and a second touch electrode 523 in an eighth row may be connected to each other via respective one of the second wires 533. Also, in the first column, a second touch electrode 523 in a third row and a second touch electrode 523 in a fourth row may be connected to each other via respective one of the second wires 533, and the second touch electrode 523 in the fourth row and a second touch electrode 523 in a ninth row may be connected to each other via respective one of the second wires 533.

The second column may have the same configuration as the first column.

That is, in the second column, a second touch electrode 523 in the first row may be connected to a second touch electrode 523 in the sixth row via respective one of the second wires 533, and the second touch electrode 523 in the sixth row may be connected to a second touch electrode 523 in the seventh row via respective one of the second wires 533. Also, in the second column, a second touch electrode 523 in the second row and a second touch electrode 523 in the fifth row may be connected to each other via respective one of the second wires 533, and the second touch electrode 523 in the fifth row and a second touch electrode 523 in the eighth row may be connected to each other via respective one of the second wires 533. Also, in the second column, a second touch electrode 523 in the third row and a second touch electrode 523 in the fourth row may be connected to each other via respective one of the second wires 533, and the second touch electrode 523 in the fourth row and a second touch electrode 523 in the ninth row may be connected to each other via respective one of the second wires 533.

The configuration of FIG. 15 can effectively reduce the number of wires.

In some exemplary embodiments, the first wires 531 and the second wires 533 may be formed of the same conductive layer as the first touch electrodes 521 and the second touch electrodes 523.

The configuration of FIG. 15 can detect the presence of touch input in a mutual capacitance method. In some exemplary embodiments, the first touch electrodes 521 may be used as driving electrodes, and the second touch electrodes 523 may be used as sensing electrodes. However, the present disclosure is not limited to this.

As is traditional in the field of the inventive concept, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies.

While the present disclosure has been particularly shown and described with reference to the exemplary embodiments thereof, it will be understood by those of ordinary skill in the art that various changes in form and detail may be made therein without departing from the spirit and scope of the present disclosure as defined by the following claims.

What is claimed is:

1. A touch panel, comprising:
    a touch sensing circuit comprising a plurality of driving electrode lines and a plurality of sensing electrode lines, wherein the sensing electrode lines are insulated from the driving electrode lines;

a driving signal generation circuit that generates a plurality of driving signals and transmits the driving signals to the driving electrode lines; and a sensing circuit that receives a plurality of sensing signals from the sensing electrode lines, wherein the sensing circuit comprises a plurality of pseudo differential charge amplifiers that receive the sensing signals, and each pseudo differential charge amplifier comprises two single-ended charge amplifiers connected to each other, wherein the driving signals have voltages that are not equal to zero during a first time zone, and a sum of driving signals generated at a same time is maintained to be equal to zero during the first time zone.

2. The touch panel of claim 1, wherein the driving signals are periodic voltages that are repeated at intervals of a second time zone, wherein the second time zone is longer than the first time zone, a period during which the sum of the driving signals is maintained to be equal to zero is shorter than the first time zone, and the sum of the driving signals generated at the same time is maintained to be equal to zero during the first time zone and the second time zone.

3. The touch panel of claim 1, wherein the driving signal generation circuit comprises a code generator that generates the driving signals.

4. The touch panel of claim 3, wherein the code generator comprises a first code generator that generates signals having non-zero voltages, and a second code generator that generates signals having voltages that sum to zero when added to the voltages of the signals generated by the first code generator.

5. The touch panel of claim 4, further comprising:
a plurality of driving analog multiplexers connected to the first and second code generators.

6. The touch panel of claim 1, further comprising:
a plurality of sensing analog multiplexers that directly receives the sensing signals and that transmits the sensing signals to the pseudo differential charge amplifiers.

7. The touch panel of claim 1, wherein the pseudo differential charge amplifiers receive the sensing signals directly from the sensing electrode lines.

8. The touch panel of claim 1, wherein the touch sensing circuit further comprises a plurality of capacitors disposed at intersections between the driving electrode lines and the sensing electrode lines.

9. A touch panel, comprising:
a touch sensing circuit comprising a plurality of driving electrode lines and a plurality of sensing electrode lines, wherein the sensing electrode lines are insulated from the driving electrode lines;

a driving signal generation circuit that generates a plurality of driving signals and transmits the driving signals to the driving electrode lines; and a sensing circuit that receives a plurality of sensing signals from the sensing electrode lines, wherein the driving signals are periodic voltages that are repeated at intervals of a first time zone, the first time zone is divided into a plurality of second time zones, wherein each of the second time zones is shorter than the first time zone, the driving signals have voltages that are not equal to zero during all time zones, and a sum of the driving signals is maintained to be equal to zero during each time zone, wherein the driving signal generation circuit comprises:

a code generator for generating the driving signals including a first code generator that generates signals having non-zero voltages, and a second code generator that generates signals having voltages that sum to zero when added to the voltages of the signals generated by the first code generator; and a plurality of driving analog multiplexers connected to the first and second code generators, and configured to output one among an output signal of the first code generator and an output signal of the second code generator.

10. The touch panel of claim 9, wherein the sensing circuit comprises a plurality of pseudo differential charge amplifiers that receive the sensing signals directly from the sensing electrode lines.

11. The touch panel of claim 9, wherein the driving signals have a same period.

12. A method of driving a touch panel, comprising:
transmitting a first signal from a voltage source to a code generator circuit;

dividing the first signal transmitted to the code generator circuit into a plurality of driving signals;

transmitting the driving signals to a plurality of driving electrode lines; and receiving, by a sensing circuit, a plurality of sensing signals from a plurality of sensing electrode lines, wherein the sensing signals are received by a plurality of pseudo differential charge amplifiers disposed in the sensing circuit, and each pseudo differential charge amplifier comprises two single-ended charge amplifiers connected to each other, wherein the driving signals have voltages that are not equal to zero during a first time zone, and a sum of driving signals generated in a same time zone is maintained to be equal to zero during the first time zone.

13. The method of claim 12, wherein the code generator circuit comprises a first code generator that generates signals having non-zero voltages, and a second code generator that generates signals having voltages that sum to zero when added to the voltages of the signals generated by the first code generator.

* * * * *